(12) United States Patent
Li et al.

(10) Patent No.: US 11,949,122 B2
(45) Date of Patent: Apr. 2, 2024

(54) BIDIRECTIONAL VENT VALVE, BATTERY, AND ELECTRICAL DEVICE

(71) Applicant: JIANGSU CONTEMPORARY AMPEREX TECHNOLOGY LIMITED, Liyang (CN)

(72) Inventors: Heyuan Li, Liyang (CN); Fan Zhang, Liyang (CN); Lei Chen, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 0 days.

(21) Appl. No.: 17/861,103

(22) Filed: Jul. 8, 2022

(65) Prior Publication Data

US 2022/0344770 A1    Oct. 27, 2022

Related U.S. Application Data

(63) Continuation of application No. PCT/CN2021/092892, filed on May 10, 2021.

(30) Foreign Application Priority Data

Jan. 12, 2021   (CN) .......................... 202110032669.9

(51) Int. Cl.
*H01M 50/333*   (2021.01)
*F16K 17/18*    (2006.01)
(Continued)

(52) U.S. Cl.
CPC ........... *H01M 50/333* (2021.01); *F16K 17/18* (2013.01); *F16K 27/0209* (2013.01); *H01M 50/24* (2021.01)

(58) Field of Classification Search
CPC ...................................................... F16K 17/18
See application file for complete search history.

(56) References Cited

U.S. PATENT DOCUMENTS 4,033,375 A * 7/1977 Hirsch ................. F16K 15/044
                                                        137/493.3
4,044,791 A * 8/1977 McKenzie ............. F16K 17/18
                                                        137/513.3
(Continued)

FOREIGN PATENT DOCUMENTS

CN      204403474 U      6/2015
CN      205605897 U      9/2016
(Continued)

OTHER PUBLICATIONS

Office Action, CN202110032669,9, dated Feb. 24, 2021, 5 pgs.
(Continued)

*Primary Examiner* — Maria Laios
(74) *Attorney, Agent, or Firm* — Kilpatrick Townsend & Stockton LLP

(57) ABSTRACT

This application discloses a bidirectional vent valve, a battery, and an electrical device. The bidirectional vent valve includes: a valve seat, where the valve seat is configured to form a gas duct, and the gas duct includes a first end and a second end; a bidirectional valve assembly, where the bidirectional valve assembly is movably disposed in the gas duct, and is configured to open or close the gas duct through movement relative to the gas duct; and a first elastic component, configured to exert a force on the bidirectional valve assembly to close the air duct, and, when an air pressure difference between the first end and the second end of the gas duct is greater than a first threshold, the bidirectional valve assembly is configured to overcome the force of the first elastic component to open the gas duct.

12 Claims, 14 Drawing Sheets

(51) Int. Cl.
*F16K 27/02* (2006.01)
*H01M 50/24* (2021.01)

(56) References Cited

U.S. PATENT DOCUMENTS

| | | | | |
|---|---|---|---|---|
| 4,428,396 A * | 1/1984 | Wall | ............... | F16K 47/10 |
| | | | | 137/493 |
| 5,282,492 A | 2/1994 | Angeli | | |
| 2002/0096214 A1 | 7/2002 | Bauer | | |
| 2010/0136402 A1 * | 6/2010 | Hermann | ............ | H01M 50/262 |
| | | | | 429/185 |

FOREIGN PATENT DOCUMENTS

| | | |
|---|---|---|
| CN | 108626451 A | 10/2018 |
| CN | 208816714 U | 5/2019 |
| CN | 209357809 U | 9/2019 |
| CN | 209725341 U | 12/2019 |
| CN | 209963134 U | 1/2020 |
| CN | 211391013 U | 9/2020 |
| CN | 211423483 U | 9/2020 |
| CN | 112361047 A | 2/2021 |
| EP | 1106880 A2 * | 6/2001 ........... F16K 17/196 |
| EP | 1930636 A2 | 6/2008 |
| EP | 3702681 A1 | 9/2020 |
| JP | 2003157115 A | 5/2003 |
| WO | 1991009244 A1 | 6/1991 |

OTHER PUBLICATIONS

Notice of Allowance received in the corresponding Korean Application 10-2022-7040208, dated Mar. 15, 2023.
The Notice of Reasons for Refusal received in the corresponding Japanese Application 2023-501523, dated Jul. 10, 2023.
The extended European search report received in the corresponding European Application 21916638.6, dated Jul. 10, 2023.

\* cited by examiner

BIDIRECTIONAL VENT VALVE, BATTERY, AND ELECTRICAL DEVICE

CROSS-REFERENCE TO RELATED APPLICATIONS

This application is a continuation application of PCT Patent Application No. PCT/CN2021/092892, entitled "BIDIRECTIONAL VENT VALVE, BATTERY, AND ELECTRICAL DEVICE" filed on May 10, 2021, which claims priority to Chinese Patent Application No. 202110032669.9, entitled "BIDIRECTIONAL VENT VALVE, BATTERY, AND DEVICE" filed with the State Intellectual Property Office of the People's Republic of China on Jan. 12, 2021, all of which are incorporated herein by reference in their entirety.

TECHNICAL FIELD

Embodiments of this application relate to the technical field of power batteries, and in particular, to a bidirectional vent valve, a battery, and an electrical device.

BACKGROUND

Generally, a power battery pack is sealed, and needs to be ventilated on the basis of meeting basic waterproof and dustproof requirements. During the running of devices such as a vehicle, pressure differs between inside and outside of the battery pack due to heat emission of the battery pack or change of altitude. Gas needs to be replenished or exhausted in time to maintain a pressure balance and prevent a shell and a sealing interface of the battery pack from deforming and failing under the pressure.

Currently, a valve with a waterproof ventilating film is commonly used as a ventilation device of the battery pack to meet basic waterproof and dustproof requirements, and an air pressure is balanced between the inside and outside of the battery pack by using the waterproof ventilating film. However, the existing waterproof ventilating film valve is designed as being normally open, and is prone to condensation as affected by external moisture. The condensation may result in failure of components, and even lead to insulation failure or short-circuit faults, posing a great threat to personal and property safety of users.

SUMMARY

In view of the problem described above, an embodiment of this application provides a bidirectional vent valve, a battery, and an electrical device to implement bidirectional controllable exchange of gas between two ends of the valve. When being used in a battery or a device that uses the battery, the bidirectional vent valve is expected to reduce the impact caused by moisture outside the battery and avoid risks of condensation in the battery.

According to an aspect of embodiments of this application, a bidirectional vent valve is provided. The bidirectional vent valve includes: a valve seat, where the valve seat is configured to form a gas duct, and the gas duct includes a first end and a second end; a bidirectional valve assembly, where the bidirectional valve assembly is movably disposed in the gas duct, the bidirectional valve assembly includes a first valve plate and a second valve plate, a first through-hole is provided on the first valve plate, a second through-hole is provided on the second valve plate, and a projection of the first through-hole in an axial direction of the gas duct is separated from a projection of the second through-hole in the axial direction of the gas duct; and a first elastic component, where a force exertion end of the first elastic component abuts against the first valve plate or the second valve plate so that the first elastic component exerts a force on the first valve plate and/or the second valve plate to make the first valve plate and the second valve plate approach each other, so as to close the gas duct, and, when an air pressure difference between the first end and the second end of the gas duct reaches a first threshold, the first valve plate is configured to move toward the first end to open the gas duct, or, the second valve plate is configured to move toward the second end to open the gas duct.

In an implementation, the first valve plate and the second valve plate are disposed coaxially with the gas duct. One of the first through-hole or the second through-hole is disposed coaxially with the gas duct, and the other is disposed along a circumferential direction of the gas duct.

In an implementation, the bidirectional valve assembly further includes a first sealing element. The first sealing element is disposed on the first valve plate and/or the second valve plate. When the bidirectional valve assembly closes the gas duct, the first sealing element is located between the first valve plate and the second valve plate and separates the first through-hole from the second through-hole.

In an implementation, a groove is provided on the first valve plate and/or the second valve plate. The first sealing element is fixed in the groove and protrudes from the groove.

In an implementation, a blocking portion is disposed on an inner wall of the gas duct. In an axial direction of the gas duct, the first valve plate and the second valve plate are disposed on two sides of the blocking portion respectively. The first valve plate is located on a side that is of the blocking portion and that is close to the first end. The second valve plate is located on a side that is of the blocking portion and that is close to the second end.

In an implementation, a first slant face is disposed at an edge of the blocking portion on a side facing the first sealing element. A second slant face is disposed at an edge of the first sealing element. The first slant face is hermetically connected to the second slant face.

In an implementation, the bidirectional valve assembly further includes an end cap. The end cap is movably disposed at the first end of the gas duct. The end cap is configured to connect to the second valve plate. The first elastic component is located between the end cap and the first valve plate.

In an implementation, the bidirectional valve assembly further includes a connecting rod configured to connect the end cap and the second valve plate.

In an implementation, the first elastic component is a first spring sheathed around the connecting rod.

In an implementation, the bidirectional vent valve further includes: a mounting seat, where the mounting seat is movably disposed on the valve seat, and a pressure relief duct is provided on the mounting seat; a third valve plate, where the third valve plate is fixed onto the valve seat and is located at the second end of the gas duct, and the third valve plate is configured to open or close the pressure relief duct through movement of the valve seat relative to the mounting seat; a second elastic component, configured to exert a force on the third valve plate to close the pressure relief duct. When an air pressure at the first end of the gas duct is greater than an air pressure at the second end and the air pressure difference reaches a second threshold, the third valve plate is configured to overcome the force of the second elastic component to open the pressure relief duct. The second threshold is greater than the first threshold.

In an implementation, a mounting hole is provided at a middle position of the mounting seat, and the valve seat is sheathed in the mounting hole.

In an implementation, the pressure relief duct is disposed along a circumferential direction of the gas duct.

In an implementation, a mounting slot around the mounting hole is disposed on a side that is of the mounting seat and that faces the first end. A limiting portion is disposed on an outer periphery that is of the valve seat and that is close to the first end. The second elastic component is a second spring disposed between the mounting slot and the limiting portion.

According to another aspect of embodiments of this application, a battery is provided, including: a box, configured to accommodate the battery cell; and the bidirectional vent valve. The bidirectional vent valve is disposed on the box. The first end of the gas duct is disposed toward inside of the box. The second end of the gas duct is disposed toward outside of the box.

According to still another aspect of embodiments of this application, an electrical device is provided. The electrical device includes the battery. The battery is configured to provide electrical energy.

The bidirectional vent valve according to embodiments of this application uses the first elastic component to exert a force on the bidirectional valve assembly to close the gas duct in the valve seat. In this way, when the air pressure difference between the two ends of the gas duct exceeds the first threshold, the bidirectional valve assembly can overcome the force of the first elastic component to open the gas duct, thereby implementing bidirectional controllable balancing and adjustment of the air pressure between the two ends of the gas duct as driven by the air pressure. When the air pressure is balanced between the two ends of the gas duct, the gas duct is in a closed state. Compared with the normally open vent valve design in the prior art, the bidirectional vent valve according to embodiments of this application can reduce the impact caused by moisture outside the battery and reduce risks of condensation when being used in a battery or a device that uses the battery.

The foregoing description is merely an overview of the technical solutions of this application. The following expounds specific embodiments of this application to enable a clearer understanding of the technical solutions of this application, enable implementation based on the content of the specification, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not intended to limit this application. In all the drawings, the same reference numeral represents the same component. In the drawings.

Figure 1:
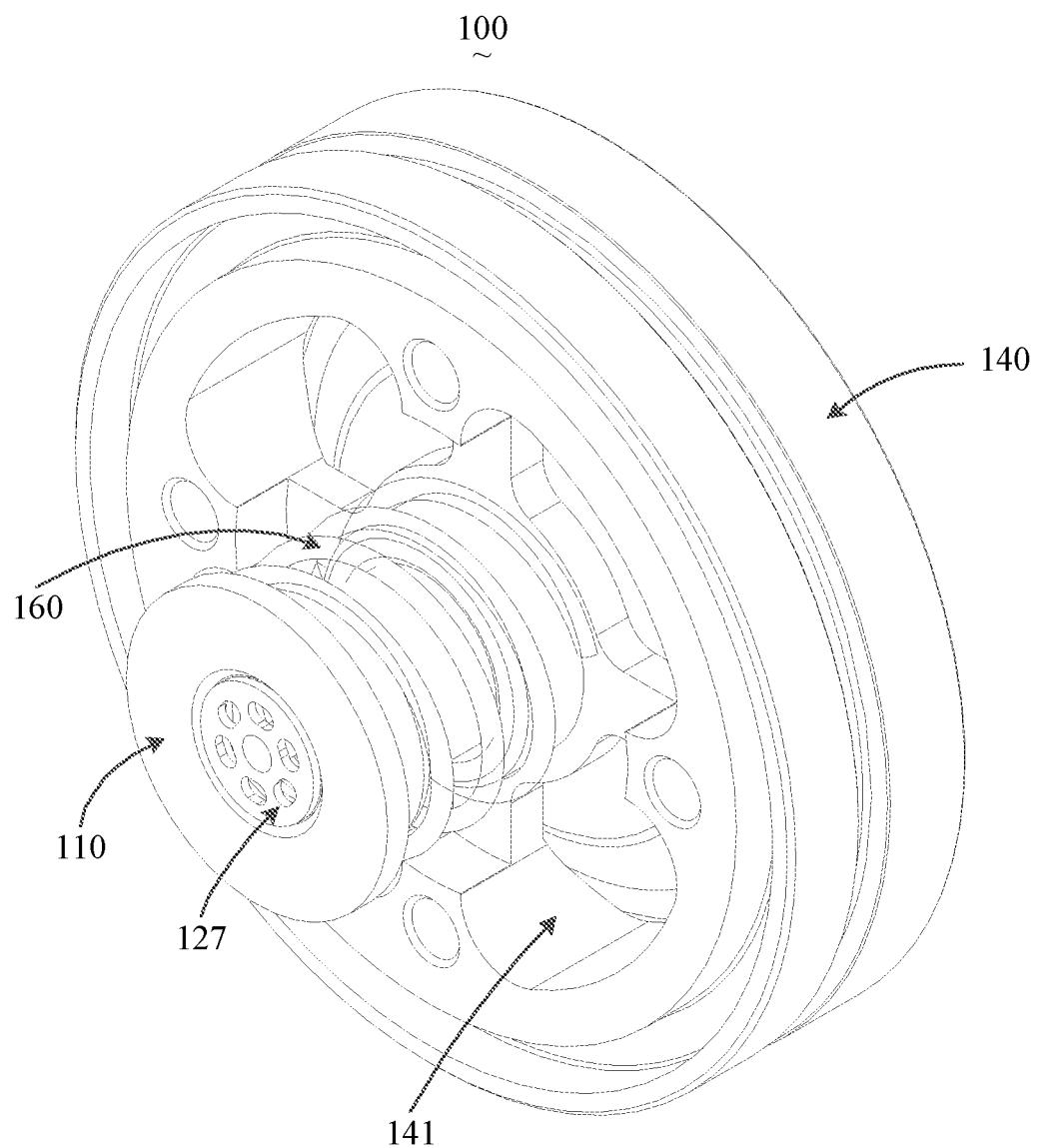
FIG. 1 is a three-dimensional schematic structural diagram of a bidirectional vent valve according to an embodiment of this application.

REFERENCE NUMERALS bidirectional vent valve 100, valve seat 110, gas duct 111, blocking portion 112, first slant face 113, limiting portion 114, bidirectional valve assembly 120, first valve plate 121, first through-hole 122, second valve plate 123, second through-hole 124, first sealing element 125, groove 126, end cap 127, third through-hole 128, connecting rod 129, first elastic component 130, mounting seat 140, pressure relief duct 141, mounting hole 142, screw hole 143, mounting slot 144, third valve plate 150, semi-permeable film 151, second elastic component 160, second sealing element 171, third sealing element 172, protection cover 180; battery 200, box 210, electrical device 300, motor 310, controller 320.

DETAILED DESCRIPTION OF EMBODIMENTS

Embodiments of the technical solutions of this application are described in detail below with reference to the drawings. The following embodiments are merely intended to describe the technical solutions of this application more clearly, and are merely exemplary but without hereby limiting the protection scope of this application.

Figure 2:
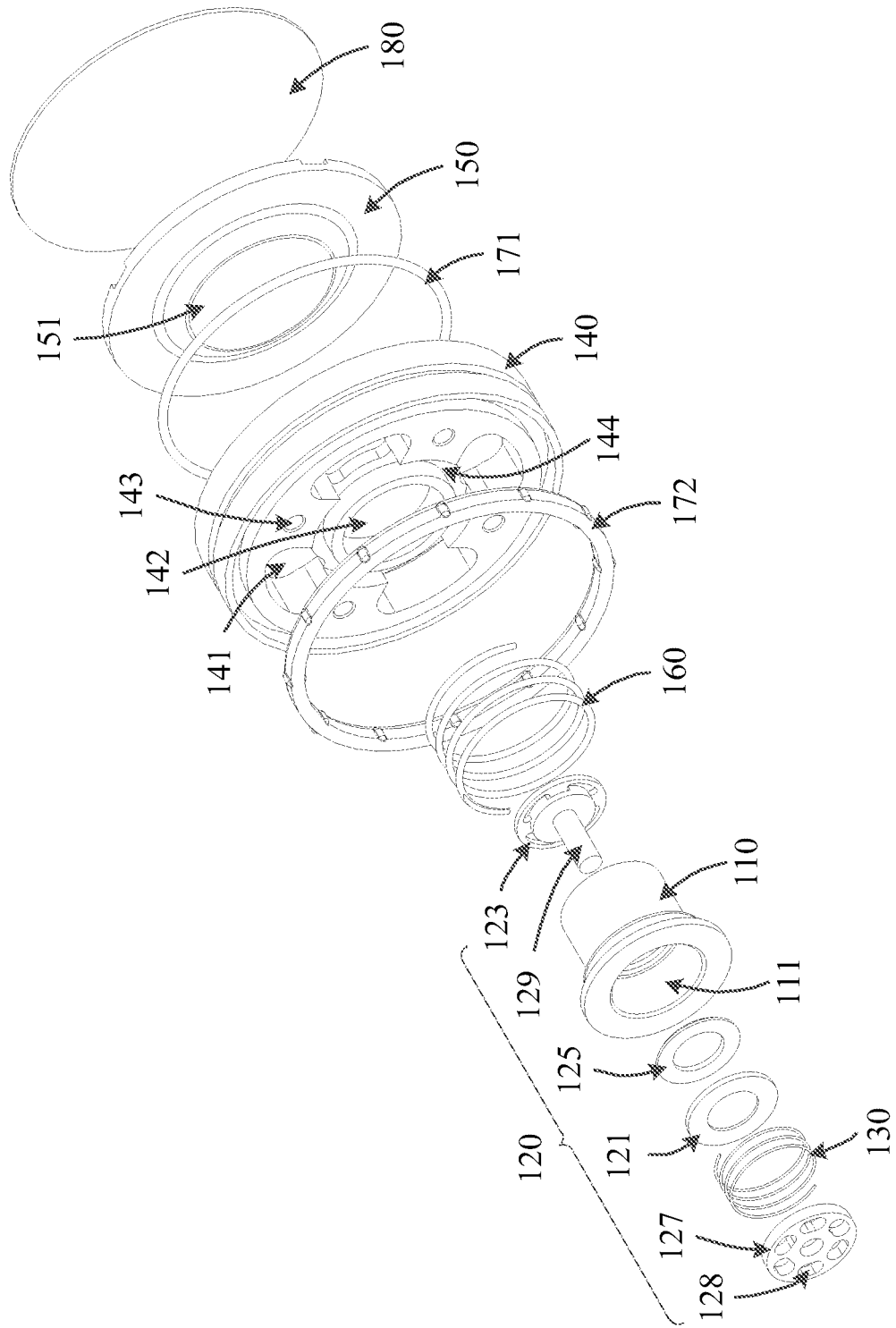
FIG. 2 is an exploded view of a bidirectional vent valve according to an embodiment of this application.

Refer to FIG. 1 and FIG. 2, which schematically show a three-dimensional structure and an exploded view, respectively, of a bidirectional vent valve according to an embodiment of this application.

As shown in the drawings, a bidirectional vent valve 100 includes a valve seat 110, a bidirectional valve assembly 120, and a first elastic component 130. The valve seat 110 is configured to form a gas duct 111. Two ends of the gas duct 111 are a first end and a second end respectively. Hereinafter, a left end of the gas duct 111 in FIG. 2 is the first end, and a right end is the second end. The bidirectional valve assembly 120 is disposed in the gas duct 111 and can move inside the gas duct 111. The gas duct 111 is opened and closed through movement of the bidirectional valve assembly 120 relative to the gas duct 111. The first elastic component 130 is configured to exert a force on the bidirectional valve assembly 120 to close the gas duct 111.

When an air pressure difference between two ends of the gas duct 111 exceeds a preset threshold (a first threshold), the bidirectional valve assembly 120 overcomes the force of the first elastic component 130, moves in the air duct 111 under the action of the air pressure difference, and opens the gas duct 111 to circulate the gas at the two ends of the bidirectional vent valve 100. In this way, the gas is exhausted or taken in to achieve an air pressure balance between the two ends of the gas duct 111. Once the air pressure is balanced, that is, once the air pressure difference between the two ends of the gas duct 111 declines below the first threshold, the bidirectional valve assembly 120 will be restored under the force exerted by the first elastic component 130, and close the gas duct 111 again.

The bidirectional vent valve 100 according to this embodiment of this application uses the first elastic component 130 to exert a force on the bidirectional valve assembly 120, so as to close the gas duct 111 when the air pressure difference between the two ends of the gas duct 111 does not reach the first threshold, that is, when the air pressure is balanced between the two ends. The gas duct 111 is not opened unless the air pressure distance between the two ends of the gas duct 111 exceeds the first threshold. In this way, as driven by the air pressure, the bidirectional controllable balance and adjustment of the air pressure are implemented between the two ends of the gas duct 111 of the bidirectional vent valve 100.

Compared with the normal-open vent valve designed in the prior art in which the gas is exchanged in real time between the two ends of the valve, the bidirectional vent valve 100 according to this embodiment of this application exchanges the gas between the two ends of the valve on demand. When the valve is used in a battery, the exchanging the gas on demand significantly reduces the frequency and amount of gas exchange between the battery and the outside, reduces the impact caused by external moisture onto the interior of the battery, reduces risks of condensation, and enhances reliability and safety of the battery and the electrical device.

In the specific embodiments shown in the drawings, the valve seat 110 is cylindrical as a whole. Accordingly, the gas duct 111 is cylindrical, and possesses an axis that runs through a midpoint of the cross section of the air duct and that extends along the length direction from the first end to the second end, for example, the axis shown in FIG. 3. Such a structure is relatively simple and can be assembled conveniently.

However, a person skilled in the art understands that for the purpose of implementing this application, what is shown in the drawings is merely exemplary. In other embodiments, the valve seat 110 and the gas duct 111 may possess other shapes and structures instead. For example, the cross section of the gas duct 111 may be in another shape; or, the gas duct 111 may include a plurality of sections that are in communication with each other. The sections may be parallel or perpendicular or at other angles to each other.

Figure 3:
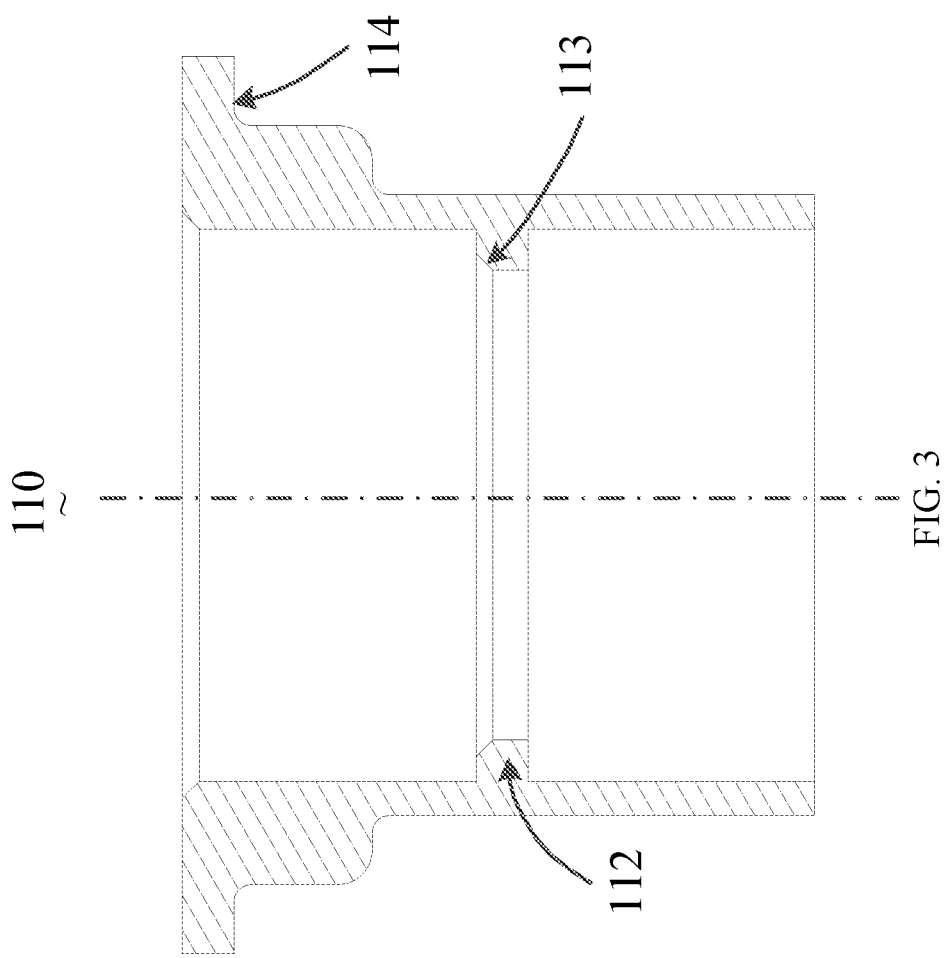
FIG. 3 is a schematic sectional view of a valve seat in a bidirectional vent valve according to an embodiment of this application, where the valve seat is sectioned along a plane in which an axis of a gas duct is located.
Figure 4:
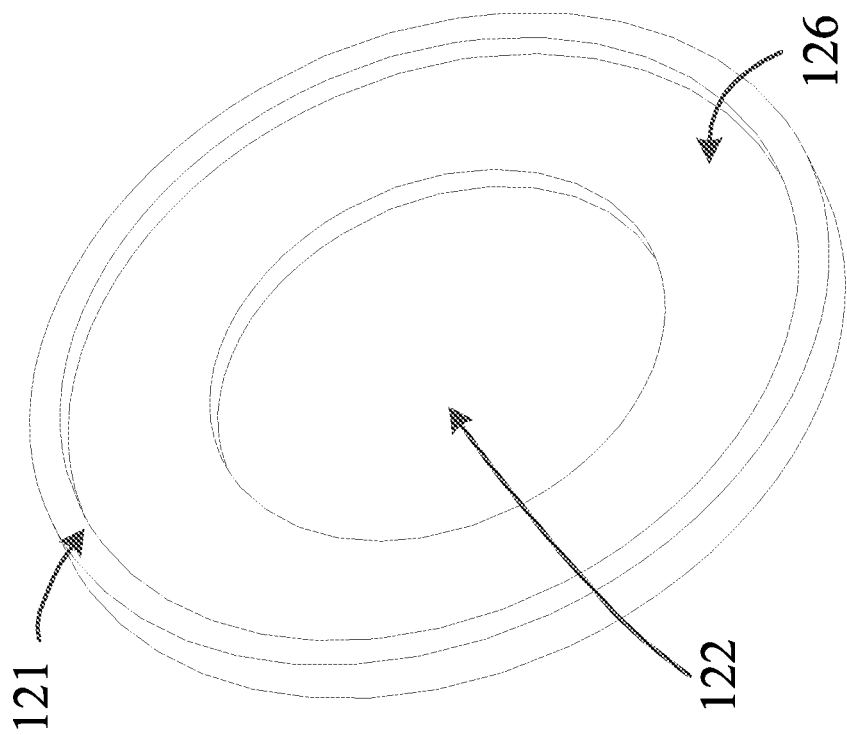
FIG. 4 is a three-dimensional schematic structural diagram of a first valve plate in a bidirectional vent valve according to an embodiment of this application.
Figure 5:
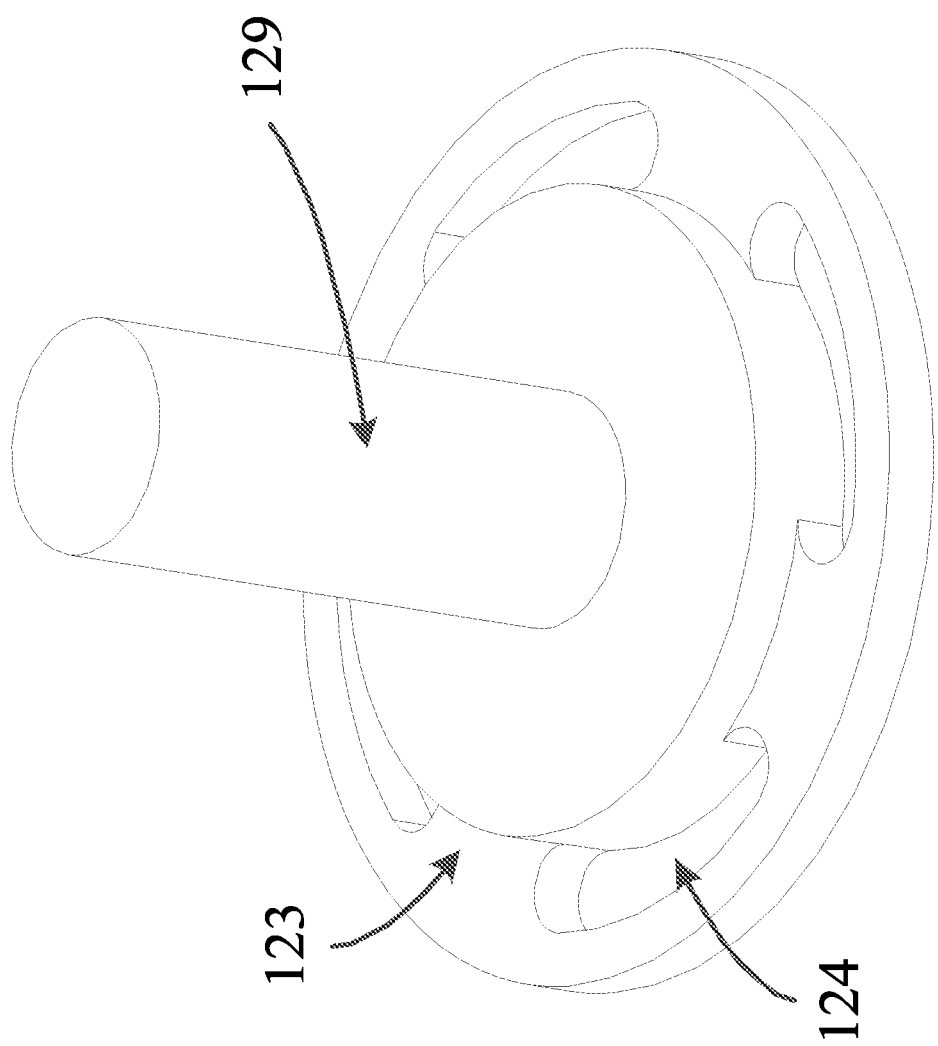
FIG. 5 is a three-dimensional schematic structural diagram of a second valve plate in a bidirectional vent valve according to an embodiment of this application.

Still referring to FIG. 2 and further referring to FIG. 3 to FIG. 5, FIG. 3 schematically shows a sectional structure of a valve seat 110 in a bidirectional vent valve 100 according to an embodiment of this application, where the valve seat is sectioned along a plane in which an axis is located; and FIG. 4 and FIG. 5 schematically show a three-dimensional structure of a first valve plate 121 and a second valve plate 123, respectively, in a bidirectional vent valve 100 according to an embodiment of this application.

In the specific embodiments shown in the drawings, a bidirectional valve assembly 120 in the bidirectional vent valve 100 includes a first valve plate 121 and a second valve plate 123. A first through-hole 122 is provided on the first valve plate 121, and a second through-hole 124 is provided on the second valve plate 123. A projection of the first through-hole 122 in an axial direction of a gas duct 111 is separated from a projection of the second through-hole 124 in the axial direction. The first elastic component 130 exerts a force on the first valve plate 121 or the second valve plate 123, or exerts a force on both the first valve plate 121 and the second valve plate 123, so as to make the two valve plates approach each other to close the gas duct 111.

The first valve plate 121 and the second valve plate 123 are arranged in the gas duct 111 along the axial direction of the gas duct 111. With the first through-hole 122 and the second through-hole 124 staggered, communication between the first through-hole 122 and the second through-hole 124 caused by coincidence or overlap is avoided when the first valve plate 121 and the second valve plate 123 approach or abut each other in a process of moving along the axial direction of the gas duct 111 under the force exerted by the first elastic component 130. In this way, it is convenient for the bidirectional valve assembly 120 to effectively close the gas duct 111.

In addition, gas from a first end of the gas duct 111 runs through the first through-hole 122 and acts on the second valve plate 123. Gas from a second end of the gas duct 111 runs through the second through-hole 124 and acts on the first valve plate 121. When an air pressure difference between the two ends of the gas duct 111 reaches a first threshold, the bidirectional valve assembly 120 overcomes an acting force of the first elastic component 130. Driven by the air pressure difference, the first valve plate 121 moves toward the first end of the air duct 111, or, the second valve plate 123 moves toward the second end of the gas duct 111, or, the first valve plate 121 and the second valve plate 123 move toward the first end and the second end of the gas duct 111 respectively, so that the two valve plates are separated or away from each other. The gas at the two ends of the gas duct 111 communicates through "the first through-hole 122—a gap between the first valve plate 121 and the second valve plate 123—the second through-hole 124" to implement gas exchange.

After the gas is exchanged by being exhausted or taken in, an air pressure balance is resumed between the two ends of the gas duct 111. That is, the gas pressure difference between the two ends drops below the first threshold. In this case, the acting force of the air pressure difference on the bidirectional valve assembly 120 is not enough to resist the acting force of the first elastic component 130. Under the force exerted by the first elastic component 130, the first valve plate 121 and the second valve plate 123 approach each other again and close the gas duct 111.

With the first valve plate 121 and the second valve plate 123 arranged along the axial direction of the gas duct 111, with the first through-hole 122 and the second through-hole 124 disposed, the gas at the two ends of the gas duct 111 acts on the second valve plate 123 and the first valve plate 121 through the first through-hole 122 and the second through-hole 124 respectively. This makes it convenient to adjust a pressure area of the valve plate by adjusting the size of the through-hole according to the pressure required for actuating the intake and exhausting of the gas. The structure is flexible and adaptable to various needs.

In the specific embodiment shown in the drawings, a movement manner of the first valve plate 121 and the second valve plate 123 in the bidirectional valve assembly 120 is to move along the axial direction of the gas duct 111. However, a person skilled in the art understands that what is shown in the drawings is merely an example. In other embodiments, the valve plates in the bidirectional valve assembly 120 may move in other manners. For example, when the pressure difference between the two ends of the gas duct 111 exceeds the first threshold, the first valve plate 121 and/or the second valve plate 123 overcome the force of the first elastic component 130 and turn over or rotate relative to each other in the gas duct 111, or move along a direction perpendicular to the axial direction of the gas duct 111. In this way, the first through-hole 122 communicates with the second through-hole 124 to open the gas duct 111.

In some embodiments, the first valve plate 121 and the second valve plate 123 are disposed coaxially with the gas duct 111. One of the first through-hole 122 or the second through-hole 124 is disposed coaxially with the gas duct 111, and the other is disposed along a circumferential direction of the gas duct 111. Such a design simplifies an overall structure of the bidirectional vent valve 100, equalizes the pressure on the first valve plate 121 and the second valve plate 123, and ensures that the first valve plate 121 and the second valve plate 123 move along the axial direction in the gas duct 111, thereby helping to enhance the structural stability and reliability of the bidirectional valve assembly 120 and the bidirectional vent valve 100.

Still referring to FIG. 2 to FIG. 5, in the specific embodiments shown in the drawings, the first through-hole 122 on the first valve plate 121 is disposed coaxially with the gas duct 111, and the second through-hole 124 on the second valve plate 123 is disposed along the circumferential direction of the gas duct 111. A person skilled in the art understands that, in other embodiments, the first through-hole 122 on the first valve plate 121 may be disposed along the circumferential direction of the gas duct 111, and the second through-hole 124 on the second valve plate 123 may be disposed coaxially with the gas duct 111. In addition, there may be one or more first through-holes 122 or second through-holes 124 disposed along the circumferential direction of the gas duct 111.

Figure 6:
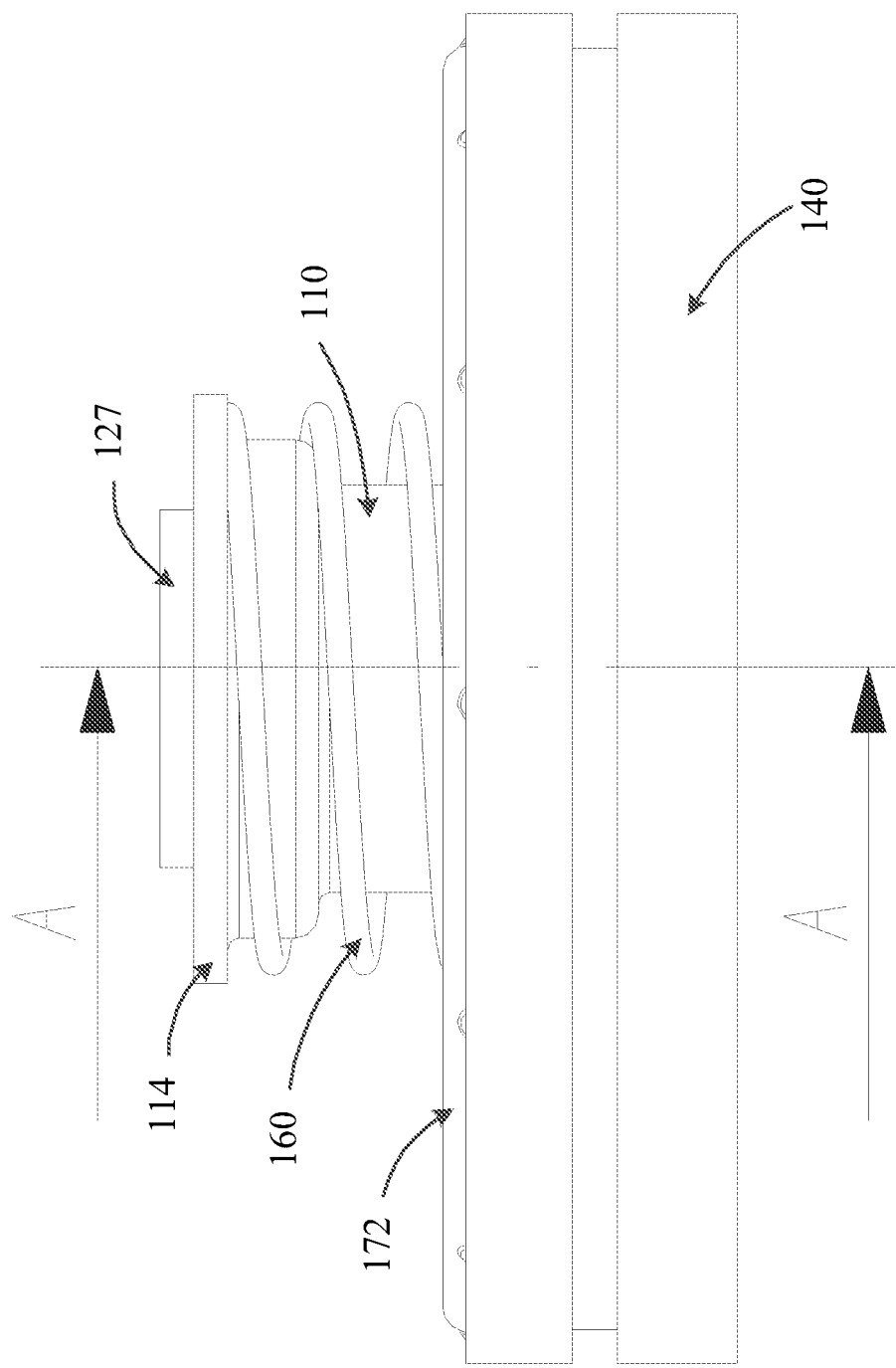
FIG. 6 is a front-view schematic structural diagram of a bidirectional vent valve according to an embodiment of this application.
Figure 7:
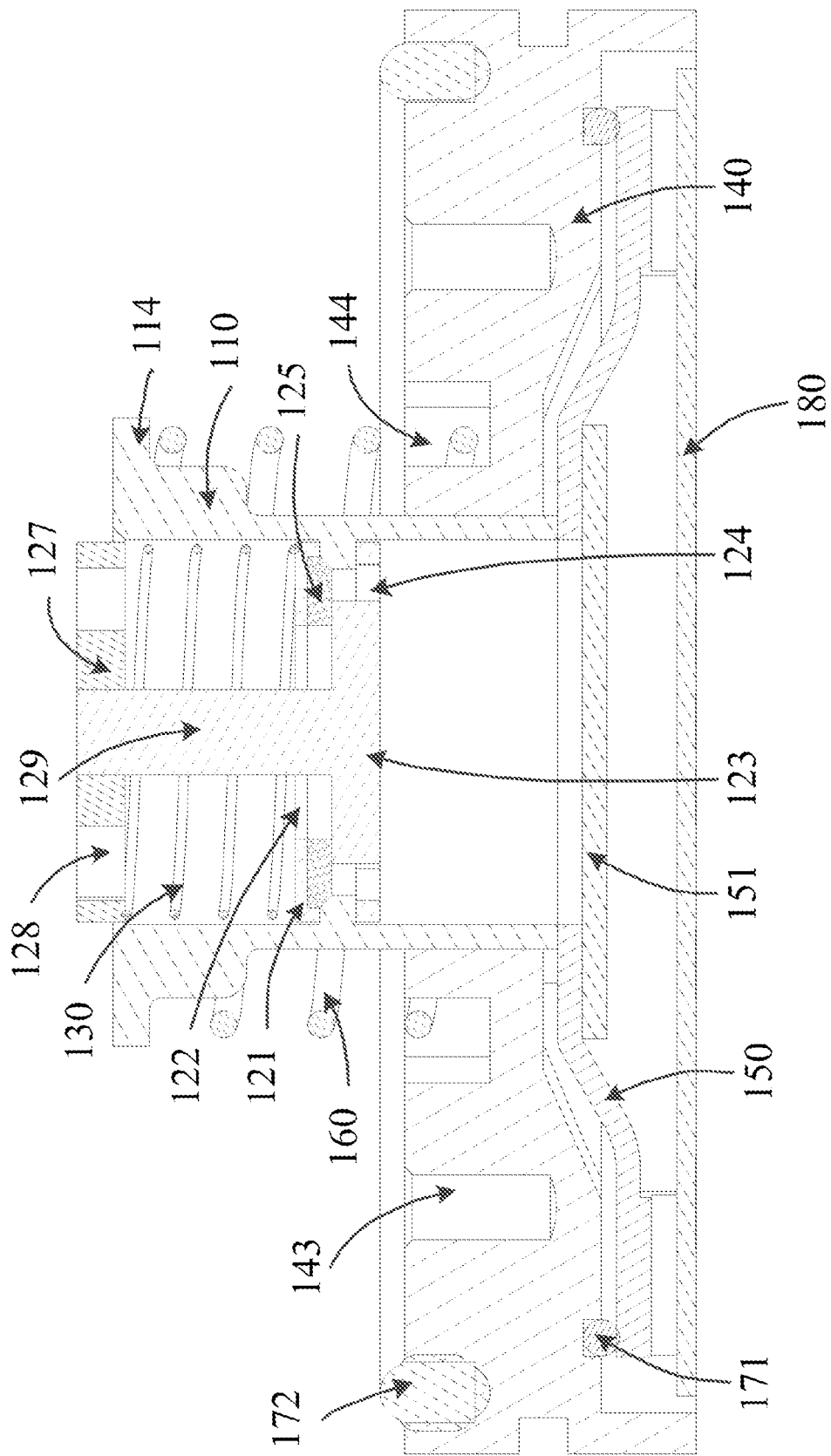
FIG. 7 is a sectional view of a bidirectional vent valve along an A-A section plane in FIG. 6 according to an embodiment of this application.
Figure 8:
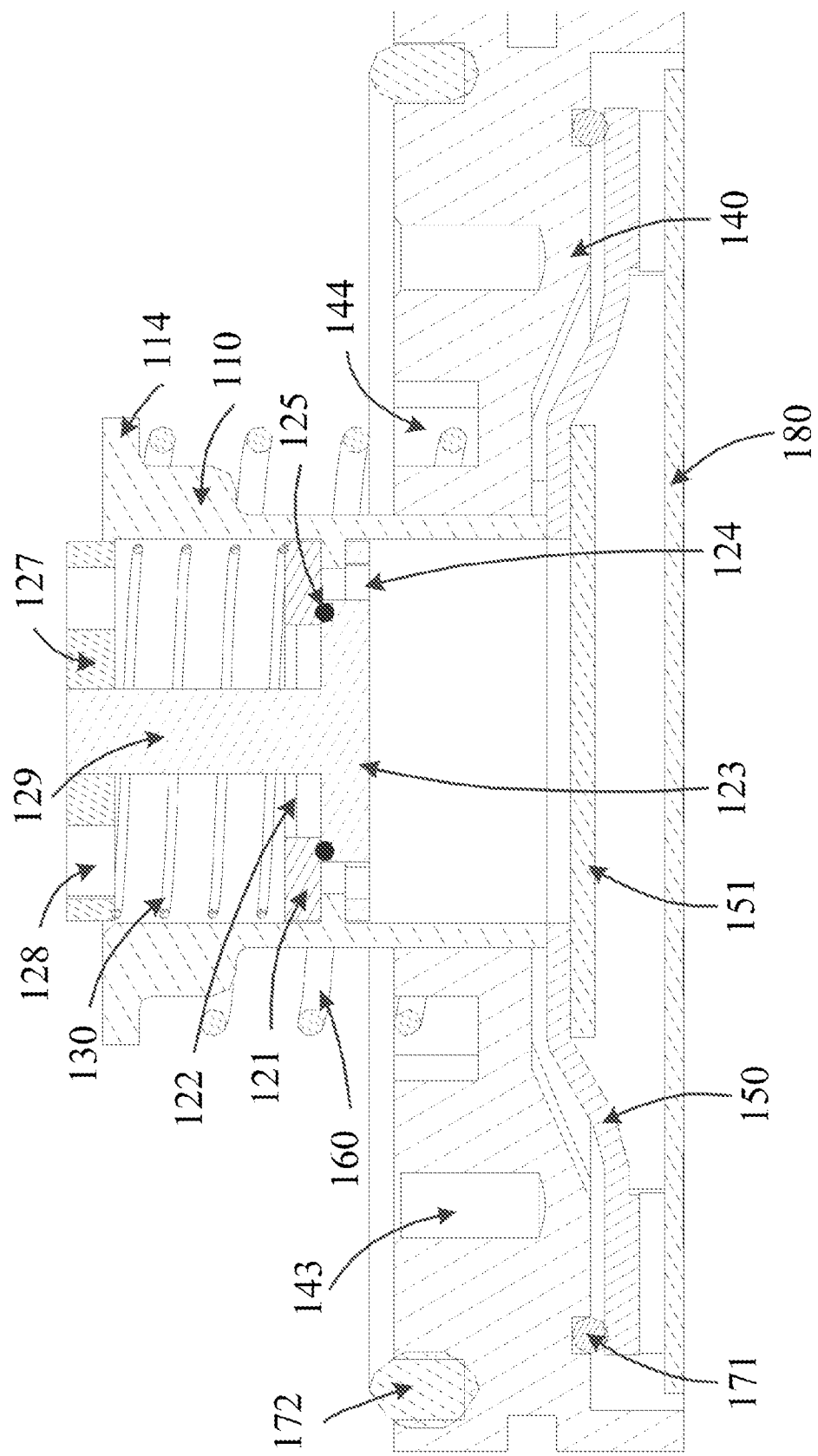
FIG. 8 is a sectional view of a bidirectional vent valve along an A-A section plane in FIG. 6 according to another embodiment of this application.

Still referring to FIG. 2 and further referring to FIG. 6 to FIG. 8, FIG. 6 schematically shows a front-view structure of a bidirectional vent valve 100 according to an embodiment of this application; and FIG. 7 and FIG. 8 schematically show a sectional structure of a bidirectional vent valve 100 along an A-A section plane in FIG. 6 according to two different embodiments of this application respectively.

In the specific embodiments shown in the drawings, the bidirectional valve assembly 120 may further include a first sealing element 125. The first sealing element 125 may be disposed on the first valve plate 121 or on the second valve plate 123, or on both the first valve plate 121 and the second valve plate 123. When the bidirectional valve assembly 120 closes the gas duct 111, the first sealing element 125 is located between the first valve plate 121 and the second valve plate 123, and separates the first through-hole 122 from the second through-hole 124.

With the first sealing element 125 disposed, and further, with the first sealing element 125 disposed on the first valve plate 121 and/or the second valve plate 123, the effect of the closing the gas duct 111 by the bidirectional valve assembly 120 is enhanced, and it is avoided that the closing fails due to a gap between the first valve plate 121 and the second valve plate 123. In addition, this provides an elastic cushion for the contact between the first valve plate 121 and the second valve plate 123.

The first sealing element 125 may be, for example, a gasket shown in FIG. 7, or a sealing ring shown in FIG. 8. A person skilled in the art understands that what is shown in the drawings is merely an example. In other embodiments, there may be one or more first sealing elements 125, as long as the sealing element serves a function of separating the first through-hole 122 from the second through-hole 124 when the first valve plate 121 and the second valve plate 123 approach each other and close the gas duct 111.

Still referring to FIG. 4 and FIG. 7, in some embodiments, a groove 126 configured to fix the first sealing element 125 may be further provided on the valve plate. The first sealing element 125 is fixed in the groove 126, and partially protrudes from the groove 126. In the specific embodiments shown in the drawings, the groove 126 is provided on the first valve plate 121 and is arranged along an outer periphery of the first through-hole 122. However, a person skilled in the art understands that, in other embodiments, the groove 126 may be provided on the second valve plate 123 instead, or the groove 126 may be provided on the first valve plate 121 and the second valve plate 123 separately. In addition, when the first sealing element 125 is structured or arranged in a different way, the arrangement of the groove 126 may adapt to the structure and number of the first sealing elements 125. For example, a plurality of grooves 126 may be provided to conveniently fix a plurality of first sealing elements 125.

By providing the groove 126 on the valve plate and fixing the first sealing element 125 onto the valve plate rather than arranging the first sealing element 125 to directly contact the inner wall of the valve seat 110, the technical solution hereof can eliminate or avoid friction between the valve seat 110 and the first sealing element 125, and enhance reliability of sealing. The depth of the groove 126 may be designed according to the amount of compression of the first sealing element 125. When the first valve plate 121 and the second valve plate 123 approach each other under the action of the first elastic component 130 to close the gas duct 111, a part that is of the first sealing element 125 and that protrudes from the groove 126 will elastically contact the other valve plate or the first sealing element 125 on the other valve plate. This further enhances effective isolation between the first through-hole 122 and the second through-hole 124 and the effect of closing the gas duct 111.

Figure 9:
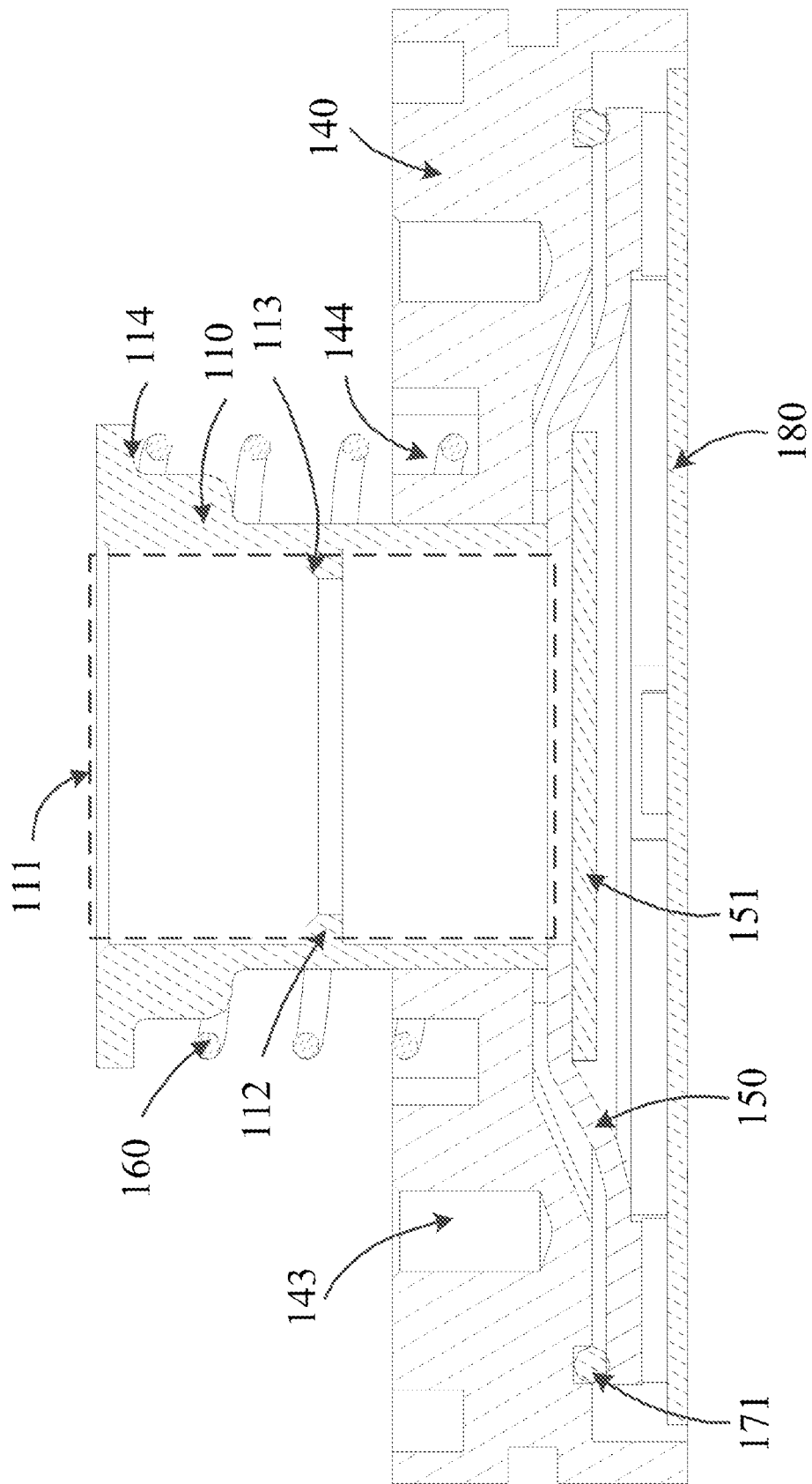
FIG. 9 is a sectional view of a bidirectional vent valve along an A-A section plane in FIG. 6 according to an embodiment of this application, where a bidirectional valve assembly and a first elastic component are removed to show a gas duct.

Still referring to FIG. 3 and further referring to FIG. 9, FIG. 9 is a sectional view of a bidirectional vent valve 100 along an A-A section plane in FIG. 6 according to an embodiment of this application, where the bidirectional valve assembly 120 and the first elastic component 130 are removed to show the gas duct 111.

In the specific embodiments shown in the drawings, a blocking portion 112 may be disposed on an inner wall of the gas duct 111. In an axial direction of the gas duct 111, the first valve plate 121 and the second valve plate 123 are disposed on two sides of the blocking portion 112 respectively. The first valve plate 121 is located on a side that is of the blocking portion 112 and that is close to the first end of the gas duct 111. The second valve plate 123 is located on a side that is of the blocking portion 112 and that is close to the second end of the gas duct 111. The blocking portion 112 may be a protruding rib that is continuously disposed on the inner wall of the gas duct 111 along the circumferential direction of the gas duct 111, as shown in the drawing. In other embodiments, the blocking portion 112 may be one or more bulges instead. When there are a plurality of bulges, the bulges may be arranged evenly or unevenly along the circumferential direction of the gas duct.

With the blocking portion 112 disposed in the gas duct 111, the bidirectional valve assembly 120 can be blocked by the blocking portion 112 during closing of the gas duct, and stay at a specific position in the gas duct 111 to enhance the stability and reliability of the overall structure of the bidirectional vent valve 100. Combined with the arrangement manner in which the first valve plate 121 and the second valve plate 123 are spaced out and disposed along the axial direction of the gas duct 111, the foregoing arrangement simplifies the overall structure of the bidirectional vent valve 100, and simplifies the assembling and operating manners of each component.

A person skilled in the art understands that what is shown in the drawings is merely an example. In other embodiments, other structures or components may be used instead to position the bidirectional valve assembly 120 in the gas duct 111. For example, a blocking structure or component may be disposed at the first end or the second end of the gas duct 111, or another fixing structure or elastic component may be disposed, so as to ensure that the bidirectional valve assembly 120 is located in the gas duct 111 and that the first valve plate 121 and the second valve plate 123 of the bidirectional valve assembly 120 are located at specific positions in the gas duct 111 when the bidirectional valve assembly 120 closes the gas duct.

Still referring to FIG. 3, FIG. 7, and FIG. 9, in the specific embodiments shown in the drawings, a first slant face 113 is disposed at an edge of the blocking portion 112 on a side facing the first sealing element 125. Correspondingly, a second slant face (not shown in the drawing) is disposed at an edge of the first sealing element 125. The first slant face 113 is hermetically connected to the second slant face. Sealing between the blocking portion 112 and the first sealing element 125 is implemented through the slant face, thereby increasing a sealing area between the blocking portion 112 and the first sealing element 125, enhancing the sealing effect, and facilitating a fit of dimensions between the first sealing element 125 and the blocking portion 112. This is particularly advantageous in an embodiment in which the first sealing element 125 is a gasket (such as the specific embodiment shown in FIG. 7).

Still referring to FIG. 2, FIG. 7, and FIG. 8, in the specific embodiments shown in the drawings, the bidirectional valve assembly 120 may further include an end cap 127 configured to connect to the second valve plate 123. The end cap 127 is movably disposed at the first end of the gas duct 111. The first elastic component 130 is located between the end cap 127 and the first valve plate 121.

Considering that the first valve plate 121 and the second valve plate 123 are arranged in the gas duct 111 along the axial direction of the gas duct 111, the first valve plate 121 is relatively close to the first end of the gas duct 111, and the second valve plate 123 is relatively close to the second end of the gas duct 111. The end cap 127 connected to the second valve plate 123 is disposed, and the first elastic component 130 is located between the end cap 127 and the first valve plate 121. The first elastic component 130 exerts a force on the end cap 127 toward the first end of the gas duct 111, and thereby indirectly exerts a force on the second valve plate 123 toward the first end of the gas duct 111. In addition, the first elastic component 130 further exerts a force on the first valve plate 121 toward the second end of the gas duct 111. In this way, the following effect is achieved tactfully: the first valve plate 121 and the second valve plate 123 of the bidirectional valve assembly 120 approach each other under the action of the first elastic component 130 and close the gas duct 111.

A person skilled in the art understands that what is shown in the drawings is merely an example. In other embodiments, other manners may apply instead to cause the first elastic component 130 to exert a force so that the first valve plate 121 and the second valve plate 123 approach each other and close the gas duct 111. For example, another end cap similar to the end cap 127 may be disposed at the second end of the gas duct 111. The other end cap is connected to the first valve plate 121. The first elastic component 130 may be located between the other end cap and the second valve plate 123. Alternatively, a blocking structure is disposed at the two ends of the gas duct 111 separately. The first elastic component 130 may include two elastic components. One elastic component is located between the blocking structure at the first end of the gas duct 111 and the first valve plate 121, and is configured to exert a force on the first valve plate 121 from the first end toward the second end. The other elastic component is located between the blocking structure at the second end of the gas duct 111 and the second valve plate 123, and is configured to exert a force on the second valve plate 123 from the second end toward the first end. In this way, the first valve plate 121 and the second valve plate 123 approach each other and close the gas duct 111. Alternatively, in other embodiments, manners other than the above may apply instead.

In the specific embodiments shown in the drawings, the end cap 127 is a pie-shaped structure with a cross section matching the cross section of the gas duct 111. A middle position of the end cap 127 is connected to the second valve plate 123. A plurality of third through-holes 128 distributed circumferentially are further provided on the end cap 127, and are configured to implement pneumatic communication between the first end of the gas duct 111 and the interior of the gas duct 111. However, a person skilled in the art understands that what is shown in the drawings is merely an example. In other embodiments, the end cap 127 may be other structures instead, and may be one or more in number, as long as the first elastic component 130 can be limited between the end cap 127 and the first valve plate 121. For example, the end cap 127 may be in a pie shape, a strip shape, or another shape with a cross-sectional area smaller than the cross-sectional area of the gas duct 111, so that pneumatic communication can be implemented by using the gap between the end cap 127 and the gas duct 111.

Still referring to FIG. 5, FIG. 7, and FIG. 8, in some embodiments, the bidirectional valve assembly 120 may further include a connecting rod 129 configured to connect the end cap 127 and the second valve plate 123. One end of the connecting rod 129 may be connected to the second valve plate 123, or may be integrated with the second valve plate 123. The other end of the connecting rod 129 is connected to the end cap 127. With the second valve plate 123 connected to the end cap 127 by the connecting rod 129, the force exerted by the first elastic component 130 on the second valve plate 123 through the end cap 127 can be conveyed along the axial direction of the gas duct 111, and is colinear to the force that is exerted by the air pressure at the two ends of the gas duct 111 on the first valve plate 121 and the second valve plate 123. This ensures proper exertion of the axial force on the first valve plate 121 and the second valve plate 123, prevents jamming, and ensures reliability and stability of the bidirectional vent valve 100.

In the specific embodiments shown in the drawings, the connecting rod 129 and the second valve plate 123 are an integrated structure, thereby further simplifying the structure and facilitating assembling. The connecting rod 129 is located at a middle position of the second valve plate 123. Correspondingly, a connecting hole is provided at a middle position of the end cap 127 and is configured to connect to the connecting rod 129. This adapts to the specific structure in this specific embodiment in which the first through-hole 122 is located at the middle position of the first valve plate 121 and is coaxial with the gas duct 111, and in which the second through-hole 124 is disposed on the second valve plate 123 along the circumferential direction of the gas duct 111. A person skilled in the art understands that what is shown in the drawings is merely an example. In other embodiments, depending on the specific structure and arrangement of the first valve plate 121 and the second valve plate 123, the connecting rod 129 may be one or more in number, and may be located at the middle position or outer periphery of the valve plate.

The connecting rod 129 may be threadedly connected to the end cap 127. For example, a screw hole may be provided at a corresponding position on the end cap 127. External threads may be provided at an end that is of the connecting rod 129 and that is connected to the end cap 127. Because the first elastic component 130 is located between the end cap 127 and the second valve plate 123, the threaded connection between the end cap 127 and the connecting rod 129 also helps to design the amount of elastic compression of the first elastic component 130 according to actual needs, and improve the control precision of gas exhausting and intake. Similarly, in an embodiment in which the connecting rod 129 is connected to the first valve plate 121, the connecting rod 129 may be threadedly connected to the first valve plate 121.

Still referring to FIG. 2, FIG. 7, and FIG. 8, in some embodiments, the first elastic component 130 may be a first spring sheathed around the connecting rod 129. The first spring compresses the first valve plate 121 and the second valve plate 123 concurrently and provides a driving resilience force and a pre-tightening force for the first valve plate 121 and the second valve plate 123, thereby enhancing the effect of closing the gas duct 111 by the bidirectional valve assembly 120 and preventing unexpected opening.

In the specific embodiments shown in the drawings, one end of the connecting rod 129 is connected to a middle position of the second valve plate 123, and runs through the first through-hole 122 at the middle position of the first valve plate 121. The other end is connected to the end cap 127. In this case, it is particularly advantageous that the first elastic component 130 is the first spring sheathed around the connecting rod 129. The structure is simple, and the assembling is convenient. The force of the first spring is exerted evenly and is collinear to the axis of the gas duct 111, thereby avoiding a fault or failure of the bidirectional vent valve 100 caused by jamming of the valve plate during operation.

A person skilled in the art understands that what is shown in the drawings is merely an example. In other embodiments, the first elastic component 130 may be another structure instead, or disposed at another position, or may be one or more in number. For example, the first elastic component 130 may be a corrugated pipe, a rubber elastomer, a metal spring, or the like. Depending on the specific structures of the first elastic component 130 and the bidirectional valve assembly 120, the position and number of the first elastic components 130 may be designed in other ways.

In some embodiments, the bidirectional vent valve 100 according to this application may function as an explosion-proof valve concurrently.

Still referring to FIG. 1, FIG. 2, and FIG. 6 to FIG. 9, in the specific embodiments shown in the drawings, the bidirectional vent valve 100 may further include a mounting seat 140, a third valve plate 150, and a second elastic component 160. The mounting seat 140 is disposed on the valve seat 110, and can move relative to the valve seat 110. A pressure relief duct 141 is provided on the mounting seat 140. The third valve plate 150 is fixed onto the valve seat 110 and is located at the second end of the gas duct 111, and is configured to open or close the pressure relief duct 141 through movement of the valve seat 110 relative to the mounting seat 140. The second elastic component 160 is configured to exert a force on the third valve plate 150 to close the pressure relief duct 141. In this way, when an air pressure at the first end of the gas duct 111 is greater than an air pressure at the second end and the air pressure difference reaches a second threshold, the third valve plate 150 can overcome the force of the second elastic component 160 to open the pressure relief duct 141. The second threshold is greater than the first threshold.

In the bidirectional vent valve 100 according to this embodiment of this application, the mounting seat 140 that can move relative to the valve seat 110 is disposed. The pressure relief duct 141 is disposed on the mounting seat 140. The second elastic component 160 exerts a force on the third valve plate 150 that is fixed to the second end of the gas duct 111 on the valve seat 110, so as to close the pressure relief duct 141, thereby implementing functions of both an explosion-proof valve and a bidirectional vent valve. The third valve plate 150 in this embodiment is a one-way explosion-proof valve plate. The gas at the first end of the gas duct 111 acts on the third valve plate 150 through the pressure relief duct 141, thereby exerting a force on the third valve plate 150 toward the second end. The gas at the second end of the gas duct 111 directly acts on the third valve plate 150, thereby exerting a force on the third valve plate 150 toward the first end.

When the air pressure at the first end of the gas duct 111 is greater than the air pressure at the second end and the air pressure difference reaches a second threshold, the air pressure difference drives the third valve plate 150 to overcome the force of the second elastic component 160, move along with the valve seat 110 relative to the mounting seat 140, and open the pressure relief duct 141. In this way, the gas at the first end of the gas duct 111 is exhausted to the second end through the pressure relief duct 141 to implement the pressure relief function. The second threshold is an explosion-proof air pressure threshold, and is greater than the first threshold that defines a critical value of balanced ventilation. When the air pressure at the first end of the gas duct 111 decreases to such an extent that the air pressure difference between the first end and the second end is less than a second threshold after completion of the pressure relief process, the air pressure difference is not enough to resist the force of the second elastic component 160. A resilience force exerted by the second elastic component 160 on the third valve plate 150 drives the third valve plate 150 to move along with the valve seat 110 relative to the mounting seat 140, so as to restore closure of the pressure relief duct 141.

Still referring to FIG. 2 and FIG. 6 to FIG. 9, in the specific embodiments shown in the drawings, the valve seat 110 is mounted at a middle position of the mounting seat 140. Specifically, a mounting hole 142 is provided at the middle position of the mounting seat 140. The valve seat 110 is sheathed in the mounting hole 142, and can move relative to the mounting seat 140 along the axial direction of the gas duct 111.

In the bidirectional vent valve 100 according to this embodiment of this application, the valve seat 110 is coaxial with the mounting seat 140. Therefore, the movement direction of the bidirectional valve assembly 120 and the third valve plate 150 is identical to the axial direction of the gas duct 111 in an intake/exhausting balance process and in an explosion-proof pressure relief process. In addition, the gas duct 111 and the pressure relief duct 141 can be used simultaneously in the pressure relief process, thereby greatly improving the pressure relief efficiency.

Still referring to FIG. 2, in the specific embodiments shown in the drawings, the pressure relief duct 141 may be disposed along the circumferential direction of the gas duct 111. For example, four pressure relief ducts 141 arranged evenly along the circumferential direction may be disposed, as shown in the drawing. In this way, the force exerted on the third valve plate 150 of the bidirectional vent valve 100 is distributed evenly in the explosion-proof pressure relief process, thereby ensuring that the third valve plate 150 can move along the axial direction of the gas duct 111, and ensuring a steady and reliable explosion-proof pressure relief process.

In some embodiments, the third valve plate 150 may be an annular valve plate corresponding to the cross-sectional shape of the mounting seat 140. The annular valve plate is fixed onto the second end of the gas duct 111 of the valve seat 110, and closes the pressure relief duct 141 that is disposed on the mounting seat 140 along the circumferential direction of the gas duct 111. In addition, the opening in the middle of the annular valve plate corresponds to the position of the gas duct 111, without blocking the intake/exhausting balance of the gas duct 111.

In other embodiments, the third valve plate 150 may further include a semi-permeable film 151 disposed at a middle position of the annular valve plate. The semi-permeable film 151 is waterproof, dust-proof, and ventilating. The semi-permeable film 151 is fixed onto the second end of the gas duct 111 of the valve seat 110. In this way, when applied to a battery, the bidirectional vent valve 100 according to this embodiment of this application can provide additional waterproof and dustproof functions for the battery, and prevent moisture and dust from entering the battery through the gas duct 111 and from damaging or affecting the functions of the battery.

In some embodiments, in order to improve the effect of sealing the pressure relief duct 141 by the third valve plate 150, a second sealing element 171 may be disposed between the third valve plate 150 and a side that is of the mounting seat 140 and that faces the second end of the gas duct 111. Similar to the description of the first sealing element 125 above, the second sealing element 171 may be a gasket or a sealing ring. In addition, a groove may be provided at a corresponding position of the mounting seat 140 so that the second sealing element 171 is fixed in the groove and that a part of the second sealing element 171 protrudes from the groove and elastically contacts the third valve plate 150.

Still referring to FIG. 1, FIG. 2, and FIG. 6 to FIG. 9, in the specific embodiments shown in the drawings, the second elastic component 160 is a second spring disposed between the valve seat 110 and the mounting seat 140. The second elastic component is configured to exert a force on the valve seat and the mounting seat, and the force compresses the third valve plate 150 from the second end of the gas duct 111 to the mounting seat 140, so as to close the pressure relief duct 141. For this purpose, a limiting portion 114 may be disposed on an outer periphery that is of the valve seat 110 and that is close to the first end of the gas duct 111. Correspondingly, a mounting slot 144 may be provided on a side that is of the mounting seat 140 and that faces the first end of the gas duct 111. The mounting slot 144 is disposed around the mounting hole 142. In this way, the second spring is sheathed on an outer sidewall of the valve seat 110.

The second elastic component 160 is a second spring sheathed on the outer periphery of the valve seat 110. The resilience force provided by the second spring is also coaxial with the gas duct 111, thereby further implementing even distribution of the force on the bidirectional vent valve 100 according to this embodiment of this application in the explosion-proof pressure relief process.

In some embodiments, in order to ensure a good sealing effect between the bidirectional vent valve and a battery box when the bidirectional vent valve 100 according to this embodiment of this application is applied to a battery, the bidirectional vent valve 100 may further include a third sealing element 172. Referring back to FIG. 2 and FIG. 6 to FIG. 9, in the specific embodiments shown in the drawings, the third sealing element 172 may be disposed on a side that is of the mounting seat 140 and that is close to the first end of the gas duct 111. That is because, when the bidirectional vent valve 100 is applied to the battery, the first end is an end located inside the battery box, and the second end is an end located outside the battery box.

Similar to the description of the first sealing element 125 and the second sealing element 171 above, the third sealing element 172 may be a gasket or a sealing ring. In addition, a groove may be provided at a corresponding position of the mounting seat 140 so that the third sealing element 172 is fixed in the groove and that a part of the third sealing element 172 protrudes from the groove and elastically contacts the battery box. A person skilled in the art understands that what is shown in the drawings is merely an example. In other embodiments, the third sealing element 172 may be another structure instead, or may be disposed at another position, for example, disposed on the valve seat 110, which is particularly advantageous in a case that the bidirectional vent valve 100 is incapable of explosion-proof pressure relief and therefore lacks for the mounting seat 140.

In some embodiments, in order to fix the bidirectional vent valve 100 onto the battery box conveniently when the bidirectional vent valve 100 according to this embodiment of this application is applied to a battery, a fixing structure may be disposed on the bidirectional vent valve 100. The fixing structure may be, for example, a screw hole 143 disposed on the mounting seat 140. In this way, the bidirectional vent valve 100 can be fixed onto the battery box by screws. A person skilled in the art understands that what is shown in the drawings is merely an example. In other embodiments, the fixing structure is not limited to the example, and other fixing manners may apply instead. In addition, the fixing structure may be disposed at another position. For example, the fixing structure may be disposed or connected onto the valve seat 110, which is particularly advantageous in a case that the bidirectional vent valve 100 is incapable of explosion-proof pressure relief and therefore lacks for the mounting seat 140.

In some embodiments, in order to provide protection for the bidirectional vent valve 100 according to this embodiment of this application, a protection cover 180 may be disposed on the bidirectional vent valve 100. The protection cover 180 may be disposed on a side that is of the bidirectional vent valve 100 and that is close to the second end of the gas duct 111. In this way, when the bidirectional vent valve 100 is applied to a battery, the protection cover 180 is located on a side outside the battery, and can provide protection for the valve seat 110, the bidirectional valve assembly 120, the third valve plate 150, and other internal structures. A gap needs to be reserved between the protection cover 180 and the valve seat 110 or the mounting seat 140 to avoid blocking the gas duct 111 and the pressure relief duct 141, and to avoid affecting the bidirectional ventilation function and the explosion-proof pressure relief function of the bidirectional vent valve 100.

Referring to FIG. 2 and FIG. 6 to FIG. 9, as shown in the drawings, the protection cover 180 may be disposed on an outermost side that is of the mounting seat 140 and that is close to the second end of the gas duct 111 in the bidirectional vent valve 100, so as to protect other internal structures.

Figure 10:
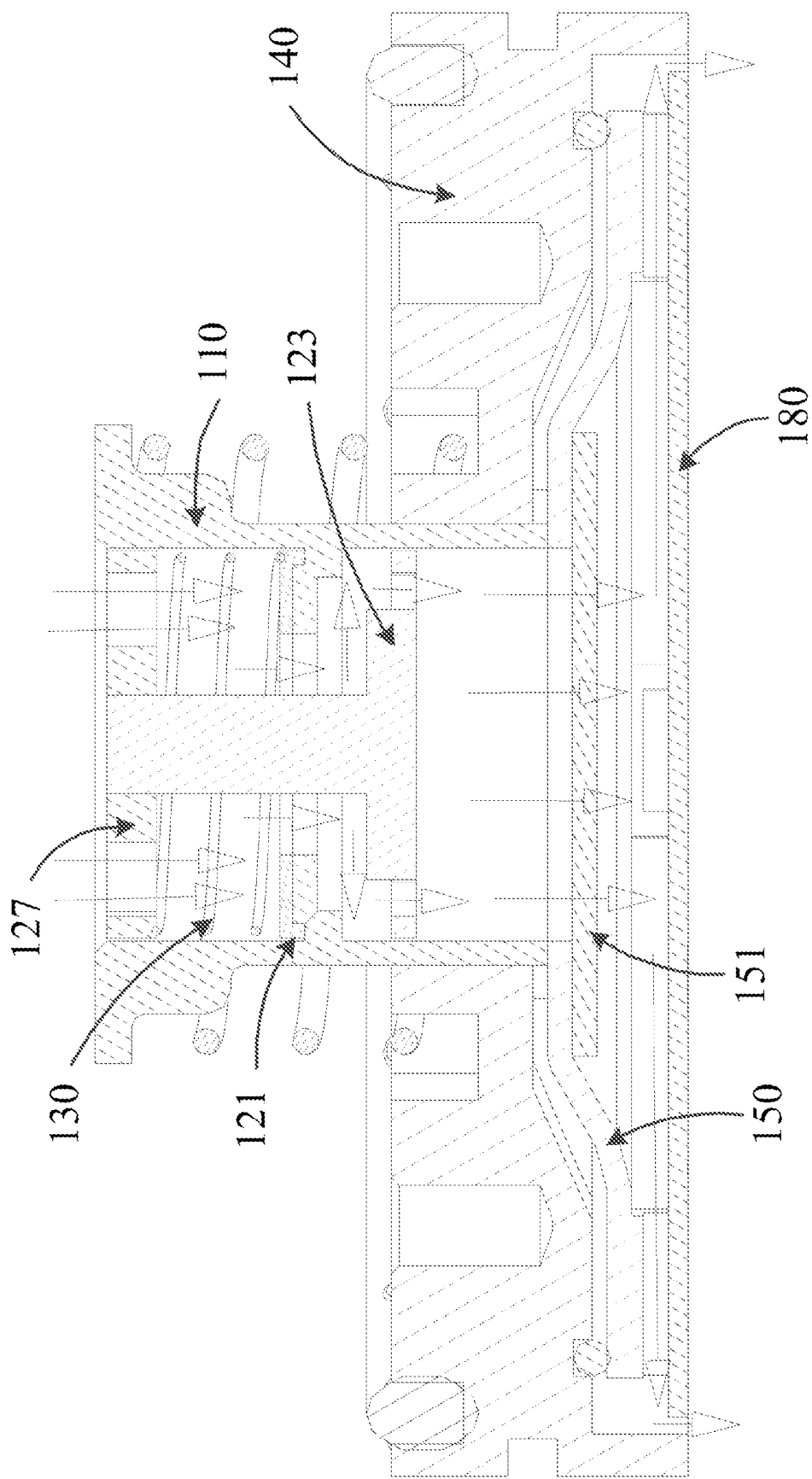
FIG. 10 is a sectional schematic structural diagram of a bidirectional vent valve during gas exhausting according to an embodiment of this application.
Figure 11:
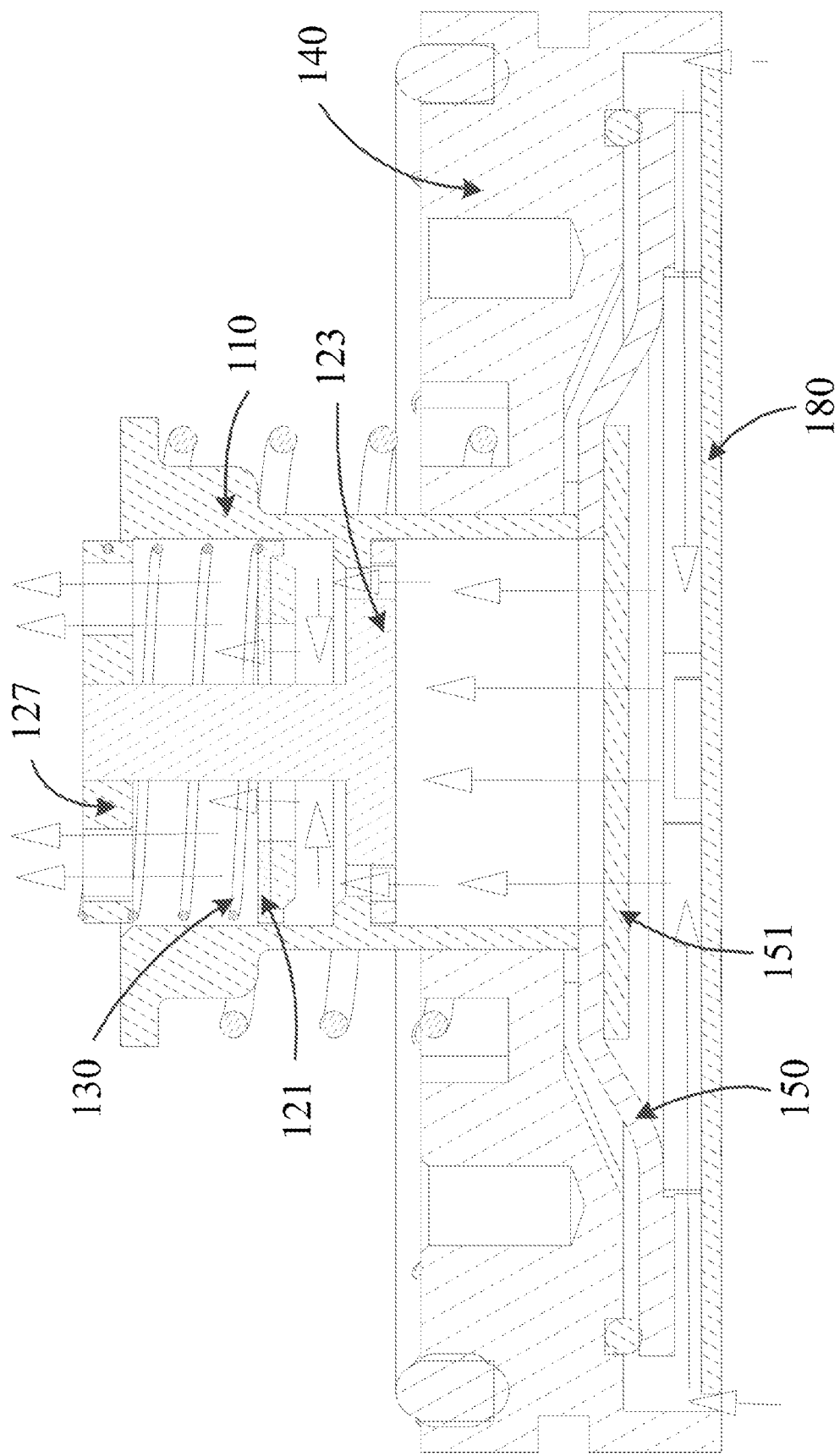
FIG. 11 is a sectional schematic structural diagram of a bidirectional vent valve during gas intake according to an embodiment of this application.
Figure 12:
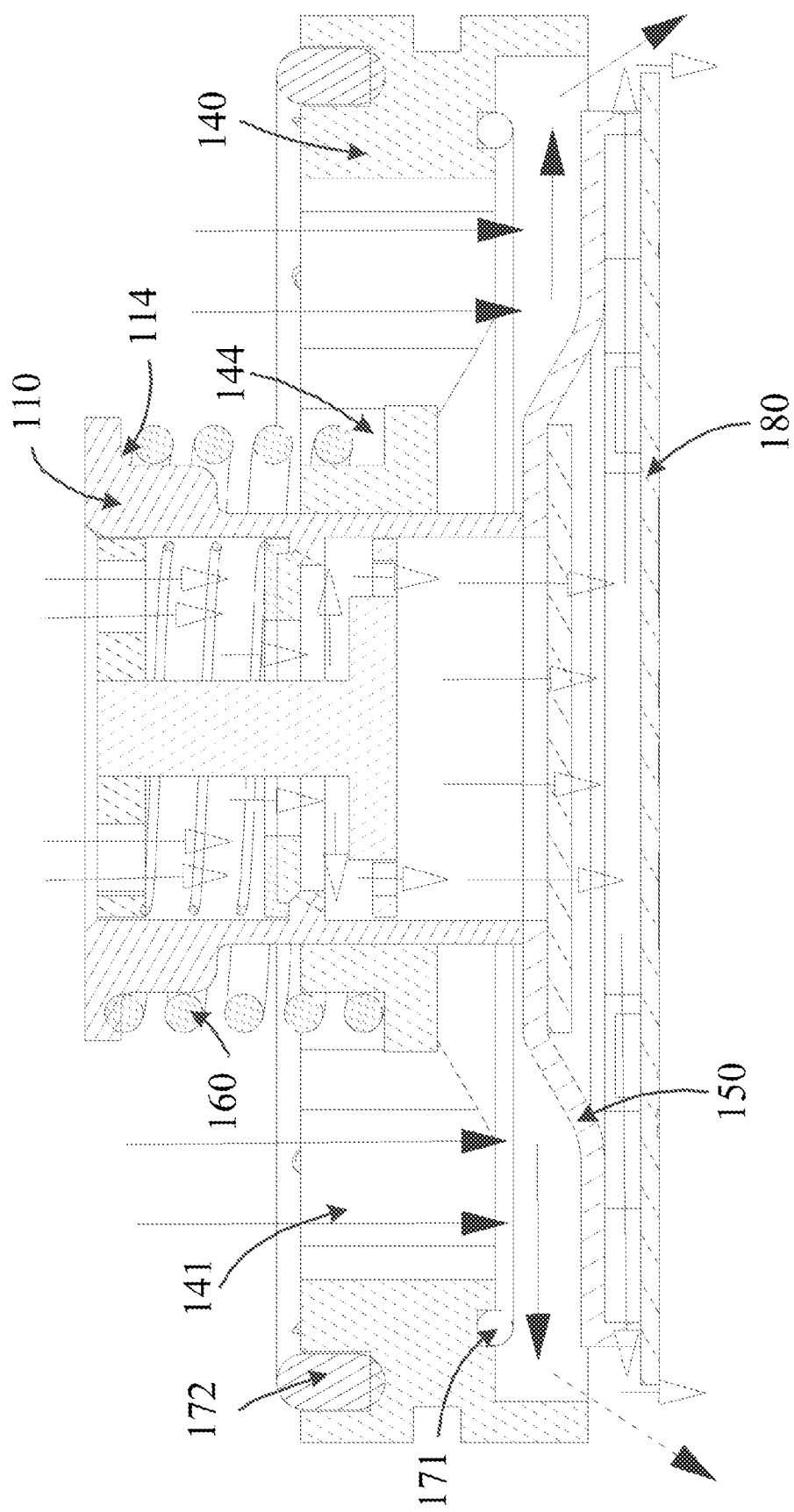
FIG. 12 is a sectional schematic structural diagram of a bidirectional vent valve during explosion-proof pressure relief according to an embodiment of this application.

Next, refer to FIG. 10 to FIG. 12, which schematically show a sectional structure of a bidirectional vent valve 100 during exhausting, intake, and explosion-proof pressure relief, respectively, according to a specific embodiment of this application. The following description will be made with reference to a scenario in which the bidirectional vent valve 100 is applied in a battery.

As shown in FIG. 10, the bidirectional vent valve 100 starts an exhausting process when the air pressure at the first end of the gas duct 111 is greater than the air pressure at the second end, that is, an internal air pressure of the battery is greater than an external air pressure, and when the air pressure difference is greater than a first threshold but less than a second threshold.

Driven by the higher air pressure inside the battery, the gas in the battery exerts a force on the second valve plate 123 after running along the gas duct 111 and passing through the first through-hole 122 on the first valve plate 121. The force pushes the second valve plate 123 outward from the battery. Under this acting force, the second valve plate 123 overcomes the force of the first spring and moves toward the second end along the axis of the gas duct 111, and is separated from the blocking portion 112 on the inner wall of the valve seat 110 and the first sealing element 125 to open the gas duct 111. In this case, the first spring is in a compressed state. The gas inside the battery will be exhausted along the gas duct 111, as indicated by the direction of the hollow arrow in FIG. 10. When the air pressure difference between the two ends of the gas duct 111 is restored to a value below the first threshold, the second valve plate 123 moves toward the first end along the axial direction of the gas duct 111 under a resilience force of the first spring, and is pressed against the blocking portion 112 on the inner wall of the valve seat 110 again, and elastically contacts the first sealing element 125 to close the gas duct 111 again.

As shown in FIG. 11, the bidirectional vent valve 100 starts an intake process when the air pressure at the first end of the gas duct 111 is less than the air pressure at the second end, that is, the internal air pressure of the battery is less than the external air pressure, and when the air pressure difference is greater than the first threshold.

Driven by the higher air pressure outside the battery, the gas outside the battery exerts a force on the first valve plate 121 after running along the gas duct 111 and passing through the second through-hole 124 on the second valve plate 123. The force pushes the first valve plate 121 inward to the battery. Under this acting force, the first valve plate 121 overcomes the force of the first spring and moves toward the first end along the axis of the gas duct 111, and is separated from the blocking portion 112 on the inner wall of the valve seat 110 to open the gas duct 111. In this case, the first spring is in a compressed state. The gas outside the battery will enter the battery along the gas duct 111, as indicated by the direction of the hollow arrow in FIG. 11. When the air pressure difference between the two ends of the gas duct 111 is restored to a value below the first threshold, the first valve plate 121 moves toward the second end along the axial direction of the gas duct 111 under the resilience force of the first spring, and is pressed against the blocking portion 112 on the inner wall of the valve seat 110 again. In addition, the first sealing element 125 elastically contacts the second valve plate 123 again to close the gas duct 111.

As shown in FIG. 12, the bidirectional vent valve 100 starts an explosion-proof pressure relief process when the air pressure at the first end of the gas duct 111 is greater than the air pressure at the second end, that is, the internal air pressure of the battery is greater than the external air pressure, and when the air pressure difference reaches the second threshold.

Because the air pressure difference between inside and outside of the battery reaches an explosion-proof threshold (the second threshold), the gas inside the battery will directly act on the third valve plate 150 through the pressure relief duct 141, and push the third valve plate 150 outward from the battery. Under this acting force, the third valve plate 150 overcomes the force of the second elastic component 160 (as an example herein, the second spring) and moves toward the second end along the axis of the gas duct 111, and is separated from the mounting seat 140 and the second sealing element 171 to open the pressure relief duct 141. In this case, the second spring is in a compressed state. The gas inside the battery will be exhausted quickly along the pressure relief duct 141, as indicated by the direction of the hollow arrow in FIG. 12. At the same time, the gas in the battery further exerts a force on the second valve plate 123 after running along the gas duct 111 and passing through the first through-hole 122 on the first valve plate 121. The force pushes the second valve plate 123 outward from the battery. At the same time, under this acting force, the second valve plate 123 overcomes the force of the first spring and moves toward the second end along the axis of the gas duct 111, and is separated from the blocking portion 112 on the inner wall of the valve seat 110 and the first sealing element 125 to open the gas duct 111. In this case, the first spring is also in the compressed state. At the same time, the gas inside the battery is further exhausted along the gas duct 111, as indicated by the direction of the hollow arrow in FIG. 12.

In this case, the gas in the battery is exhausted along both the pressure relief duct 141 and the gas duct 111 concurrently. Therefore, the gas pressure inside the battery can be more quickly decline below the second threshold (that is, the explosion-proof threshold), thereby improving the safety of the battery. The third valve plate 150 moves toward the first end together with the valve seat 110 along the axial direction of the gas duct 111 under a resilience force of the second spring, and is pressed against the mounting seat 140 again, and elastically contacts the second sealing element 171 to close the pressure relief duct 141 again. In this case, the gas duct 111 may remain open, and keep adjusting the air pressures inside and outside the battery until the air pressure is balanced between inside and outside of the battery (that is, the air pressure difference is less than the first threshold).

Figure 13:
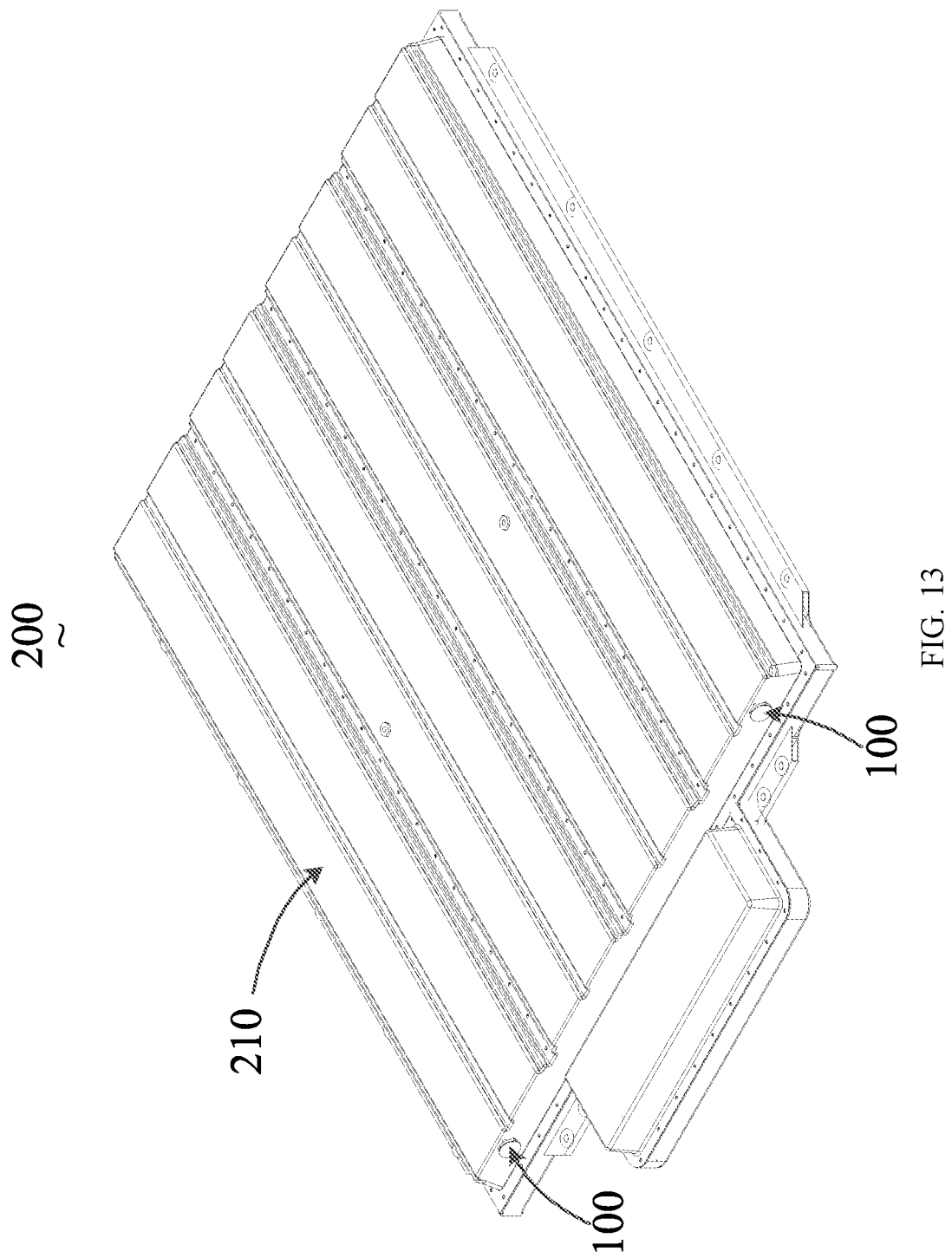
FIG. 13 is a three-dimensional schematic structural diagram of a battery according to still another embodiment of this application.

The bidirectional vent valve 100 according to this embodiment of this application is particularly applicable to a battery. According to another aspect of embodiments of this application, a battery 200 is further provided. Refer to FIG. 13, which schematically shows a three-dimensional structure of the battery 200 according to still another embodiment of this application.

As shown in the drawing, the battery 200 includes a box 210, a battery cell (not shown in the drawing) accommodated in the box 210, and the bidirectional vent valve 100 according to the foregoing embodiment of this application. The bidirectional vent valve 100 is fixed onto the box 210. The first end of the gas duct 111 is disposed toward the inside of the box 210, and the second end of the gas duct 111 is disposed toward the outside of the box 210.

As mentioned above, in some embodiments, the bidirectional vent valve 100 may be fixed onto the box 210 of the battery 200 by using a fixing structure of the bidirectional vent valve 100, for example, by using the screw hole 143 located on the mounting seat 140. In some embodiments, the third sealing element 172 disposed on the bidirectional vent valve 100 may be used to ensure the sealing between the bidirectional vent valve 100 and the box 210 of the battery 200.

Figure 14:
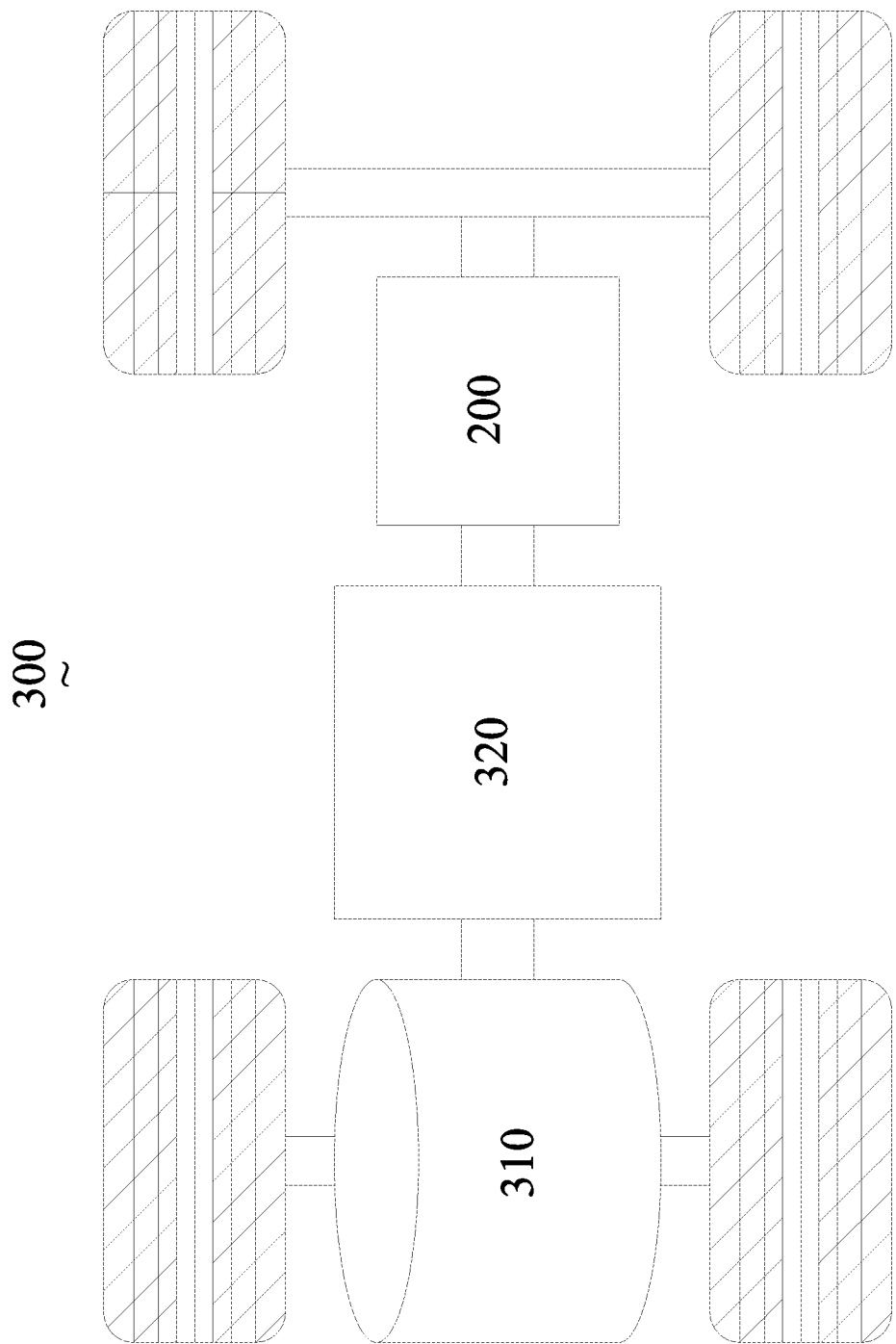
FIG. 14 is a schematic structural diagram of an electrical device according to yet another embodiment of this application.

According to yet another aspect of embodiments of this application, an electrical device 300 is further provided. The electrical device includes the battery 200. The battery 200 is configured to provide electrical energy for the electrical device 300. Refer to FIG. 14, which schematically shows a structure of the electrical device 300 according to yet another embodiment of this application.

In the specific embodiment shown in the drawing, the electrical device 300 may be, for example, a vehicle. The vehicle may be an oil-fueled vehicle, a natural gas vehicle, or a new energy vehicle. The new energy vehicle may be a battery electric vehicle, a hybrid electric vehicle, a range-extended electric vehicle, or the like. The battery 200 is disposed inside the vehicle, or the battery 200 is disposed at the bottom, front, or rear of the vehicle. The vehicle may include a motor 310, a controller 320, and a battery 200. The battery 200 is configured to provide electrical energy for the vehicle. The controller 320 controls the battery 200 to supply power to the motor 310 to operate the motor 310, so as to drive wheels or other components of the vehicle to work. Definitely, what is shown in the drawing is merely an example. In other embodiments, the electrical device 300 may be another device that includes the battery 200 and that is powered by the battery 200, for example, a mobile phone, a portable device, a notebook computer, an electric power cart, an electric vehicle, a ship, a spacecraft, electric toy, or a power tool.

It needs to be noted that, unless otherwise specified, the technical terms used in embodiments of this application have the meanings commonly understood by a person skilled in the related art of embodiments of this application.

In the description of embodiments of this application, a direction or a positional relationship indicated by the terms such as "center", "longitudinal", "transverse", "length", "width", "thickness", "upper", "lower", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In addition, the technical terms such as "first" and "second" are used merely for descriptive purposes but are not to be construed as indicating or implying relative importance or implicitly specifying the quantity of technical features indicated. In the description of the embodiments of this application, unless otherwise expressly specified, "a plurality of" means two or more.

In the description of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in the embodiments of this application according to the context.

In the description of embodiments of this application, unless otherwise expressly specified and defined, a first feature being "on" or "under" a second feature may mean that the first feature is in direct contact with the second feature, or the first feature is in indirect contact with the second feature through an intermediary. In addition, a first feature being "on", "above", or "over" a second feature may mean that the first feature is directly above or obliquely above the second feature, or just mean that the first feature is at an altitude higher than the second feature. A first feature being "under", "below", or "beneath" a second feature may mean that the first feature is directly under or obliquely under the second feature, or just mean that the first feature is at an altitude lower than the second feature.

Finally, it needs to be noted that the foregoing embodiments are merely intended to describe the technical solutions of this application but not to limit this application. Although this application is described in detail with reference to the foregoing embodiments, a person of ordinary skill in the art understands that modifications may still be made to the technical solutions described in the foregoing embodiments, or equivalent replacements may still be made to some or all technical features thereof. The modifications and equivalent replacements, which do not make the essence of the corresponding technical solutions depart from the scope of the technical solutions of the embodiments of this application, fall within the scope of the claims and specification hereof. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A bidirectional vent valve, comprising:
   a valve seat, wherein the valve seat is configured to form a gas duct, and the gas duct comprises a first end and a second end;
   a bidirectional valve assembly, wherein the bidirectional valve assembly is disposed in the gas duct, the bidirectional valve assembly comprises a first valve plate and a second valve plate, a first through-hole is provided on the first valve plate, a second through-hole is provided on the second valve plate, and a projection of the first through-hole in an axial direction of the gas duct is separated from a projection of the second through-hole in the axial direction of the gas duct, wherein the first valve plate and the second valve plate are disposed coaxially with the gas duct and, one of the first through-hole or the second through-hole is disposed coaxially with the gas duct, and the other is disposed along a circumferential direction of the gas duct; and a first elastic component, wherein a force exertion end of the first elastic component abuts against the first valve plate or the second valve plate so that the first elastic component exerts a force on the first valve plate and/or the second valve plate to make the first valve plate and the second valve plate approach each other to close the gas duct, and, when an air pressure difference between the first end and the second end of the gas duct reaches a first threshold, the first valve plate is configured to move toward the first end to open the gas duct, or, the second valve plate is configured to move toward the second end to open the gas duct; and, wherein the bidirectional valve assembly further comprises a first sealing element, the first sealing element is disposed on the first valve plate and/or the second valve plate, and, when the bidirectional valve assembly closes the gas duct, the first sealing element is located between the first valve plate and the second valve plate and separates the first through-hole from the second through-hole, wherein a blocking portion is disposed on an inner wall of the gas duct, and, in an axial direction of the gas duct, the first valve plate and the second valve plate are disposed on two sides of the blocking portion respectively, the first valve plate is located on a side that is of the blocking portion and that is close to the first end, and the second valve plate is located on a side that is of the blocking portion and that is close to the second end.

2. The bidirectional vent valve according to claim 1, wherein a groove is provided on the first valve plate and/or the second valve plate, and the first sealing element is fixed in the groove and protrudes from the groove.

3. The bidirectional vent valve according to claim 1, wherein a first slant face is disposed at an edge of the blocking portion on a side facing the first sealing element, a second slant face is disposed at an edge of the first sealing element, and the first slant face is hermetically connected to the second slant face.

4. The bidirectional vent valve according to claim 1, wherein the bidirectional valve assembly further comprises an end cap, the end cap is movably disposed at the first end of the gas duct, the end cap is configured to connect to the second valve plate, and the first elastic component is located between the end cap and the first valve plate.

5. The bidirectional vent valve according to claim 4, wherein the bidirectional valve assembly further comprises a connecting rod configured to connect the end cap and the second valve plate.

6. The bidirectional vent valve according to claim 5, wherein the first elastic component is a first spring sheathed around the connecting rod.

7. The bidirectional vent valve according to claim 1, wherein the bidirectional vent valve further comprises:

a mounting seat, wherein the mounting seat is movably disposed on the valve seat, and a pressure relief duct is provided on the mounting seat;

a third valve plate, wherein the third valve plate is fixed onto the valve seat and is located at the second end of the gas duct, and the third valve plate is configured to open or close the pressure relief duct through movement of the valve seat relative to the mounting seat;

a second elastic component, configured to exert a force on the third valve plate to close the pressure relief duct, wherein, when an air pressure at the first end of the gas duct is greater than an air pressure at the second end and the air pressure difference reaches a second threshold, the third valve plate is configured to overcome the force of the second elastic component to open the pressure relief duct, wherein, the second threshold is greater than the first threshold.

8. The bidirectional vent valve according to claim 7, wherein a mounting hole is provided at a middle position of the mounting seat, and the valve seat is sheathed in the mounting hole.

9. The bidirectional vent valve according to claim 8, wherein the pressure relief duct is disposed along a circumferential direction of the gas duct.

10. The bidirectional vent valve according to claim 8, wherein a mounting slot around the mounting hole is disposed on a side that is of the mounting seat and that faces the first end, a limiting portion is disposed on an outer periphery that is of the valve seat and that is close to the first end, and the second elastic component is a second spring disposed between the mounting slot and the limiting portion.

11. A battery, characterized in that the battery comprises:
a battery cell;
a box, configured to accommodate the battery cell; and
a bidirectional vent valve according to claim 1, wherein the bidirectional vent valve is disposed on the box, the first end of the gas duct is disposed toward inside of the box, and the second end of the gas duct is disposed toward outside of the box.

12. An electrical device, characterized in that the electrical device comprises a battery according to claim 11, and the battery is configured to provide electrical energy.

\* \* \* \* \*